(12) United States Patent
Olsson

(10) Patent No.: US 7,368,075 B2
(45) Date of Patent: *May 6, 2008

(54) IMPACT MACHINE AND A METHOD OF FORMING A BODY

(75) Inventor: Håkan Olsson, Karlskoga (SE)

(73) Assignee: Morphic Technologies Aktiebolag (Publ), Karlskoga (SE)

( * ) Notice: Subject to any disclaimer, the term of this patent is extended or adjusted under 35 U.S.C. 154(b) by 237 days.

This patent is subject to a terminal disclaimer.

(21) Appl. No.: 11/100,558

(22) Filed: Apr. 7, 2005

(65) Prior Publication Data

US 2005/0189672 A1   Sep. 1, 2005

Related U.S. Application Data

(62) Division of application No. 10/362,192, filed on Feb. 21, 2003, now abandoned.

(51) Int. Cl.
*B29C 43/04* (2006.01)

(52) U.S. Cl. ............... 264/109; 264/123; 425/78; 425/352

(58) Field of Classification Search ............... None
See application file for complete search history.

(56) References Cited

U.S. PATENT DOCUMENTS

| | | | |
|---|---|---|---|
| 3,867,077 A | 2/1975 | Deprez | 425/405 |
| 4,008,021 A | 2/1977 | Fedrigo et al. | 425/3 |
| 4,352,648 A | 10/1982 | Hilton | 425/78 |
| 4,712,404 A | 12/1987 | Crout et al. | 72/8 |
| 6,698,267 B1 * | 3/2004 | Olsson | 72/355.6 |

FOREIGN PATENT DOCUMENTS

| | | |
|---|---|---|
| DE | 38 27 769 A1 | 1/1989 |
| DE | 296 23 943 | 11/2000 |
| EP | 0 423 429 A1 | 4/1991 |
| EP | 1 093 873 A1 | 4/2001 |
| WO | WO 99/51426 | 10/1999 |

OTHER PUBLICATIONS

International Search Report Citing the Non-U.S. References.

* cited by examiner

*Primary Examiner*—Mary Lynn Theisen
(74) *Attorney, Agent, or Firm*—Pillsbury Winthrop Shaw Pittman, LLP

(57) ABSTRACT

The invention concerns an impact machine for forming a body with desired shape of a formable working material through impact action in a forming operation, said impact machine comprising a machine stand (6), an upper unit which comprises either a lower impact unit (3), which comprises a counter-impact device, or a stationary anvil, and a central unit between the upper and the lower units. The central unit (4) comprises one or more carriers (30), each of which containing and carrying one or a plurality of identically equal tool units (32), each of which comprising a die (34) with a mould cavity (46) for the working material (90) intended to be formed, said carriers including at least one carrier which is stationary during the forming operation and which contains at least one such tool unit, and that motion devices (7) are provided for indexing the carrier or carriers in a horizontal plane for positioning the tool units in different function stations (1-V), comprising a forming station (II) and at least one more station.

9 Claims, 16 Drawing Sheets

IMPACT MACHINE AND A METHOD OF FORMING A BODY

This application is a division of U.S. patent application Ser. No. 10/362,192, filed Feb. 21, 2003 now abandoned.

TECHNICAL FIELD

The invention concerns an impact machine for forming a body with desired shape of a formable working material through impact action in a forming operation, said impact machine comprising a machine stand, an upper unit which comprises an upper impact unit with an upper ram and an upper punch, a lower unit which comprises either a counter-impact device or a stationary anvil, and a central unit between the upper and the lower unit. The invention also concerns a method of forming a body of formable working material of such a machine.

STATE OF THE ART

Impact machines for working by the employment of high kinetic energy are machines for working in the first place metal, such as cuing, punching, and plastic forming of powder components, powder compaction, and similar operations, in which the speed of a ram, which may consist of a press piston, may be essentially higher than in conventional presses. Also polymeric and ceramic working materials can be conceived, as well as various composites of metals, polymers and ceramic materials. The working principle is based on the development of a very high kinetic energy of short duration instead of a high static press force of long duration. The dynamic forces of short duration which are generated at the ram impact and which in impact machines of prior art are conveyed around in the system via stand and foundation may be several thousand times larger than in conventional presses and imply that considerable amounts of energy are lost in stands and foundations instead of being used for effective work in an optimal way. In order to be able to absorb large force pulses, impact machines of prior art are equipped with very strong and heavy stands and foundations according to principles which are common in connection with conventional presses. Nevertheless the dynamic, shock type force pulses that are developed in impact machines are not damped in such heavy, conventional systems. The stress on all joints therefore become very large, as well as on sensitive components, e.g. electronic components for controlling those hydraulic valves which usually form parts of impact machines, which may cause a great risk of failure. Large, unwieldy stands also give rise to problems in connection with service, change of tool unit or of tool insets in the tool unit, changing the height of the impact unit above the tool unit, etc.

Another problem with known impact machines of the said type is that they have a comparatively small production capacity. This basically is due to the clumsiness of the machines, which makes it difficult to provide the machine with devices which would make a rational production possible.

DISCLOSURE OF THE INVENTION

It is a first purpose of the invention to address and to solve the last mentioned problem, i.e. to provide a machine which allows a rational manufacturing of bodies with desired shape from a formable working material.

This and other objectives can be achieved therein that the central unit comprises one or more carriers, which contain and carry one or a plurality of identically equal, tool units, each one of which comprises a die having a mould cavity for the working material that shall be moulded, said carriers including at least one carrier which is stationary during the forming operation and which contains at least one such tool unit; that motion devices are provided for indexing the carrier or carriers in a horizontal plane for positioning the tool units in different function stations; that said function stations comprise a forming station in which the die is coaxial with the upper punch, and at least one more station which is either a station for filling a mould cavity in the die with working material which shall be formed to said body with desired shape the forming station, or a station for ejection of the formed body out from the die; that the counter-action device or said anvil is provided under the carrier in the region of the forming station; that the kinetic energies of the movable masses during the forming operation, which comprise a single stroke of the upper ram, are essentially transferred to the working material in the mould cavity and are so large that the working material is plasticised and flows out to fill all parts of the mould cavity when the punches are maximally brought together, to form said body with desired shape; and that the counter-action device of the lower unit or said stationary anvil is provided in the region of the forming station, under the carrier, which is stationary during the forming operation. The working material may consist of e.g. a powder or one or more completely or not completely solid or porous agents of in the first place metal or possibly polymeric or ceramic material or of various composites of metallic, polymeric, or ceramic materials.

Among further aspects of the invention, it may be mentioned that the invention aims at achieving also one or more of the following advantages:

- to essentially isolate the carrier of the central unit, which is stationary during the forming operation, from impact forces at the forming operation and from shock waves from the impact, wherein the carrier may be designed to be light and need not require any great mechanical strength,
- to counteract shock waves from the impact via the machine stand, which in turn makes it possible to use a light carrier in the central unit, and to eliminate heavy bases, which according to prior art have had the purpose of absorbing shock waves,
- to reduce the total mass of the machine in comparison with known comparable impact machines, including reducing the sizes of the impact unit or impact units, at the same time as lower string velocities can be employed for the achievement of desired working and a high production capacity can be achieved,
- to provide that the kinetic energy of rams can be used essentially for effective work in connection with the working of a working material instead of being lost in tools and auxiliary equipment, such as in the carrier of the central unit and in stand and foundation, which in turn can create improved possibilities to work and/or to form materials which previously have not been possible to be worked and/or formed to a desired degree,
- to make it possible to compact metal powders or other formable powder, such as ceramic powders or composite powders consisting mainly of metal, ceramic and/or polymeric powders, to a higher and more even density than what has been possible by means of prior art because of losses of energy in tools and auxiliary equipment, to enable an easy and quick adjustment of the distance of the impact unit or impact units, respectively, above and under the central unit, respectively, to make it possible to design the impact units, or the impact unit and the counter-impact device, respectively, such that shock waves are superposed, which enhances the effect of the movable units upon the working material, and to make it possible to manufacture compacted bodies in the machine with desired shape from metal powder, essentially without communicating pores and with such a great strength that they can be pushed out from their mould cavity without being damaged and be moved to a furnace in order, in a subsequent treatment, to be heated to sintering temperature, wherein the powder grains, which were softened and changed as to their shape in the machine, will be welded together (sinter, coalesce) for the achievement of a very dense body with high strength.

According to a first embodiment, the impact machine comprises an upper impact unit with an upper ram, a lower impact unit with a lower ram and a lower punch, which together with the upper punch and the die, which has a through hole, define the mould cavity for the working material. It is a characteristic feature of the mode of operation of the machine according to this first embodiment that the upper ram and the lower ram are caused to perform a single stroke with such a velocity against an upper impact body, which is integrated with or is pressed against the upper punch, and against a lower impact body, respectively, said lower impact body being integrated with or pressed against the lower punch, that those masses which move downwards, including the upper punch, will achieve a downwards directed velocity $v_1$, and those masses which move upwards, including the lower punch, will achieve an upwards directed velocity $v_2$, said movable members having such masses and said velocities being so high that the impulses of the downwards movable masses and of the upwards movable masses will be essentially equal, i.e. such that the following condition applies:

$$m_1 \times v_1 = m_2 \times v_2$$

where $m_1$ is the total mass of the masses moving downwards, and $m_2$ is the total mass of the masses moving upwards at the impact;

that the kinetic energies of the movable masses, i.e.

$$\frac{m_1\, v_1^2}{2}, \text{ and } \frac{m_2\, v_2^2}{2},$$

respectively, are essentially transferred to the working material in the mould cavity and are so great that the working material is plasticised and flows out to fill all parts of the mould cavity, when the punches are maximally brought together, for the formation of said body with desired shape; and that the die is essentially stationary during said stroke. Further aspects on this performance are disclosed in the Swedish patent application No 0002030-5, the content of which is herewith included in the present patent application by reference.

According to a second, conceivable embodiment, the lower unit comprises a counter-action device in the form of an anvil assembly, said assembly including an anvil and a tool unit with tool and object to be worked, members being provided for moving the anvil assembly upwards towards the ram which is included in the upper unit and moves downwards during the forming operation, to meet the ram as the anvil assembly is being moved, simultaneously with the ram being moved downwards.

According to a third embodiment, which can be combined with said first or said second embodiment, or with a stationary anvil under the central unit in the region of the first forming station, the upper impact unit and the lower impact unit, or the upper impact unit, respectively, in the case when a movable or stationary anvil is provided under the central unit, are/is suspended via shock absorbers, in addition to which lifting devices are provided in order to adjustably raise and lower the impact units or the impact unit respectively.

Further characteristic features and aspects of the invention will be apparent from the appending patent claims, the detailed description of the invention, and from what is disclosed in the above mentioned Swedish patent applications, which have been included in the present patent application by reference.

BRIEF DESCRIPTION OF DRAWINGS

In the following detailed description of the invention, two preferred embodiments will be described with reference to the accompanying drawings, in which.

DETAILED DESCRIPTION OF THE INVENTION

Embodiment according to FIG. 1-FIG. 11

Figure 1:
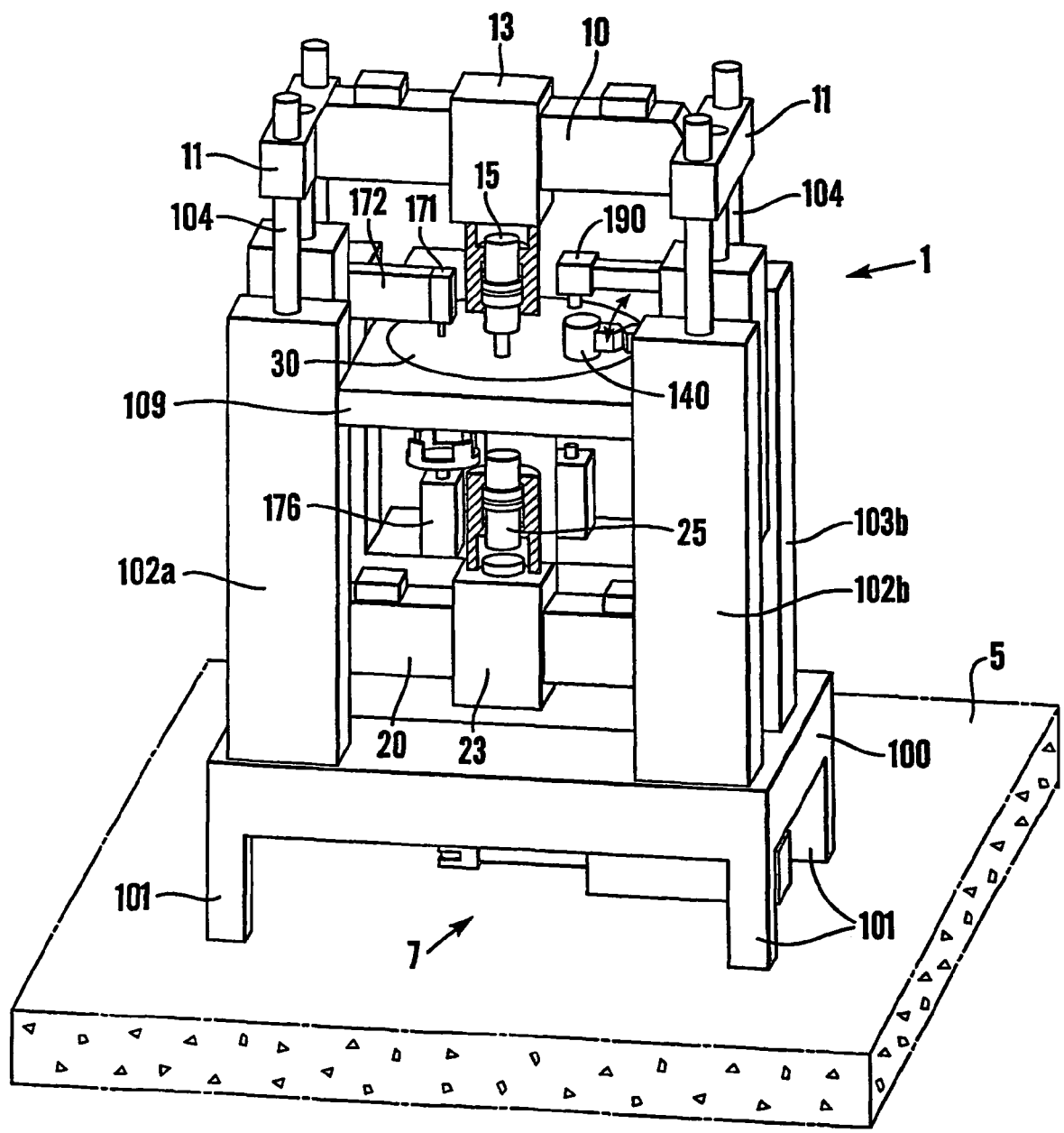
FIG. 1 is a perspective view of an impact machine according to said first embodiment, a forming station facing the viewer.
Figure 2:
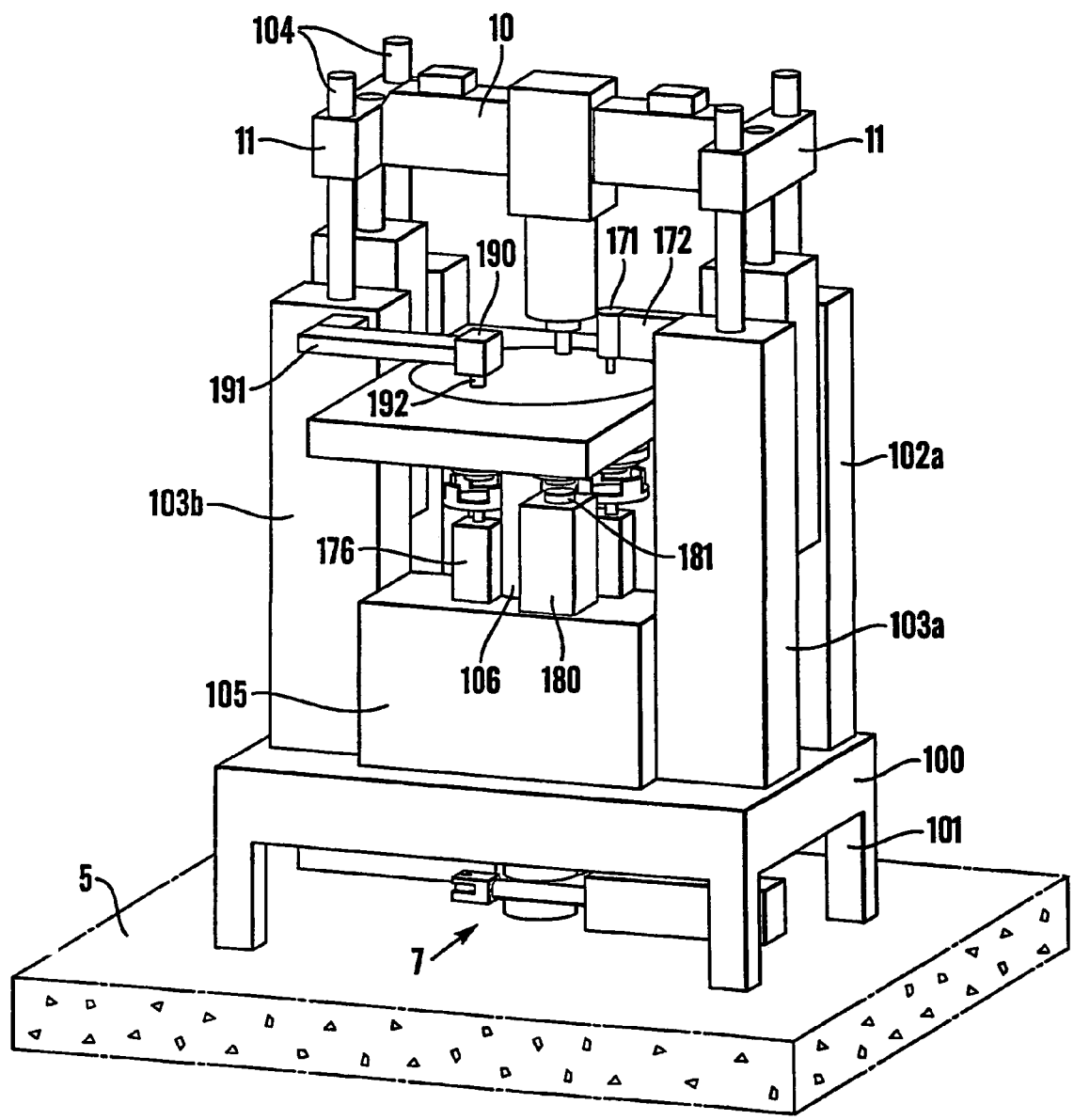
FIG. 2 shows the same impact machine in a perspective view from the opposite direction.

With reference first to FIGS. 1 and 2, an impact machine is generally designated 1. Its main parts, FIGS. 3 and 4, consist of an upper impact unit 2, a lower impact unit 3, a central unit 4, comprising a turntable 30 which can be rotated in a horizontal plane, motion members 7 for the turntable 30, and a stand, FIG. 5.

The stand 6 consists of a strong steel plate 100 having four legs 101, which are anchored to a foundation 5, two pairs of columns 102a, 102b; and 103a, 103b, which extend upwards from the plate 100, four vertical rods—guides—which proceed vertically upwards from the columns 102, 103, a block 105 on the plate 100, and a tubular column 106 on the block 105.

The turntable 30, which is concentric with the column 106, rests on the column 106 via not shown thrust bearings and can be rotated via a rotational shaft 108 about a vertical center of rotation by means of said motion members 7 under the plate 100, which shaft ratably extends through the plate 100, the block 105, and the tubular column 106. The turntable 30 is also supported laterally by a rectangular, horizontal plate 109, which is stationary mounted between the columns 102a and 103a, on one side, and between the columns 102b and 103b, on the other side. The turntable 30 thus can be said to be radially journalled in the plate 109. A suitable material for the turntable 30 is aluminum or any other light metal or light metal alloy, or any other light material, e.g. a polymer, or a composite material which makes the table of light construction.

The turntable 30 contains and carries a number of identical tool units 32, which are evenly distributed at equal distance from the center of rotation 107 of the table, i.e. with an indexing of 72°. The tool units 32 can, by stepwise turning—indexing—of the turntable 30 clockwise with reference to FIG. 1, adopt desired, indexed positions in five function stations, which according to a preferred embodiment consist of the following stations:

I a filling station
II a forming station
III a mandrel driving down station
IV an ejection station, and
V a re-setting station.

Hydraulic devices in the different units of the impact machine 1, including hydraulic devices in the five function stations, are supplied with pressure fluid from the block 105, which is a hydraulic center for distributing hydraulic fluid. In the block 105 there is a main distribution channel 150 from pump and a main channel 151 which is connected to tank or to accumulator. Main conduits to and from the main channels 150 and 151 for the upper and lower impact units 2 and 3, and to the central unit 4 are shown schematically in the form of the conduits 152, 153, 154, and 155, which lead to the columns 103a and 103b and via the columns further on to the various units. The mandrel driving down station III is supplied via the conduits 156 and 157, the ejection station via the conduits 158 and 159, the re-setting station V via the conduits 160, 161, and the filling station via the conduits 162 and 163. The motion members 7 are supplied via the conduits 164-167.

Figure 10:
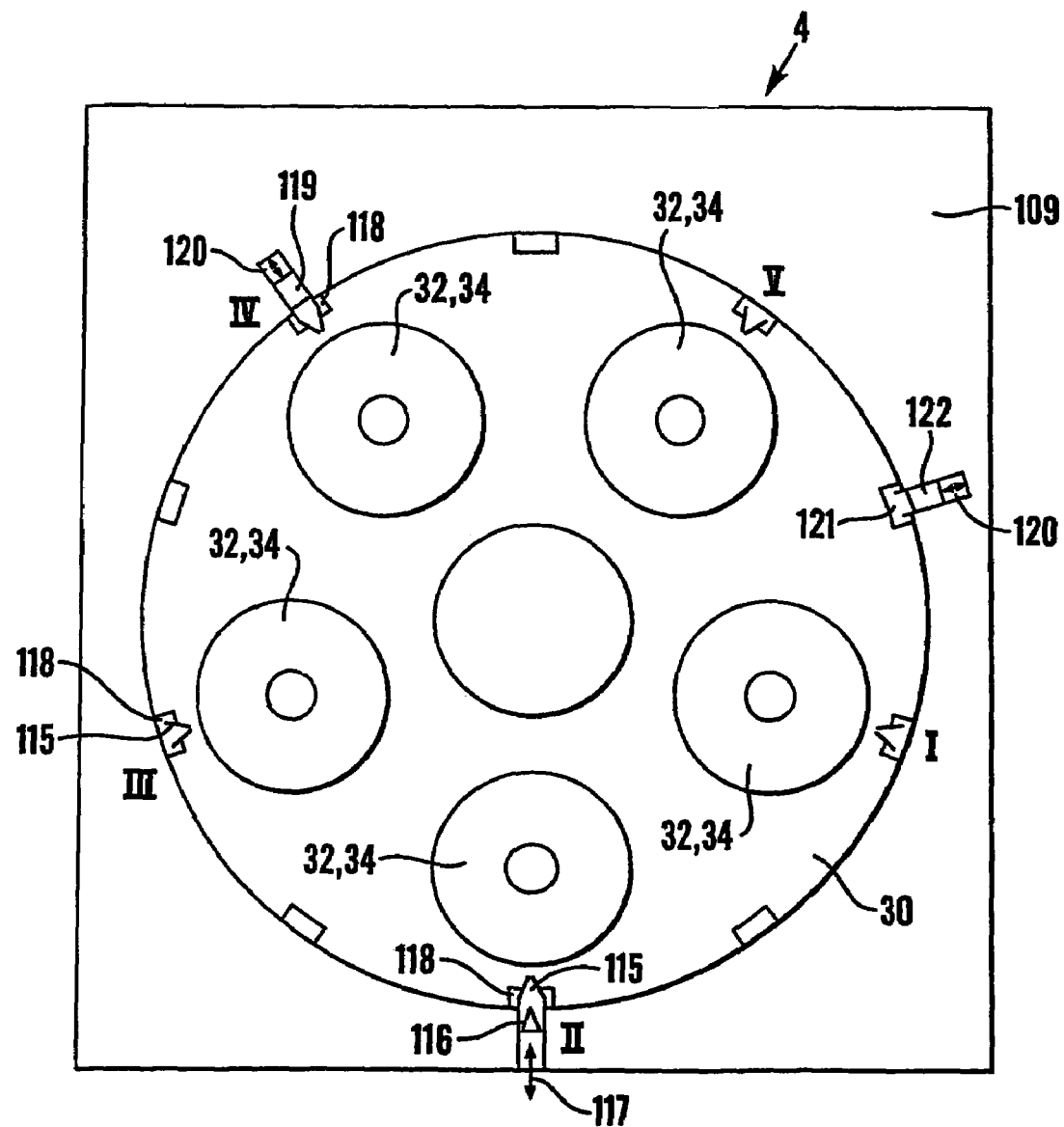
FIG. 10 shows the central unit with the carrier and its auxiliary equipment in a view from above.

In order that the tool units 32 shall be indexed with a very great accuracy in the function stations, which is particularly important as far as the forming station II is concerned, there are provided five recesses 115, FIG. 10, which are wedge-shaped in a horizontal section, in the region of the edge of the turntable 30; one recess in front of each tool unit 32. In the region of the forming station II there is provided a wedge shaped device 116 in the plate 109. The device 116 can be moved into the wedge shaped recess 115 by means of a schematically shown motion device 117, which may consist of e.g. a hydraulic piston. Further, second recesses 118 are provided adjacent to each of the wedge shaped recesses 115, for receiving a locking bolt 119, which in the ejection station IV can be brought into said second recesses 118 from a resting position in the plate 109 by means of a second motion device, e.g. a hydraulic piston 120. Further, there is a third recess 121 provided between the wedge shaped recesses 115 and the second recesses 118. These third recesses are designed so as to be able to receive a locking bolt 122 in the region between said fifth and first forming stations. In a way corresponding to the provisions for the fixation members 115 and 119, a third motion device 123 is provided in the plate 109 for the bolt-shaped locking member 122. As the turntable 30 performs its indexing movements about the rotational center 107 of the table, all fixation and locking devices 116, 119, and 122 are withdrawn to their resting positions in the plate 109.

The motion members 7 for the rotation of turntable 30 are provided under the plate 100. The motion members 7 according to the embodiment are of a kind which is known per se and comprise a pair of hydraulic cylinders 130 attached to the bottom side of the plate 100, said hydraulic cylinders having piston rods 131, which are provided to be able to rotate an outer sleeve 133 about 72° about the centre of rotation 107 of the turntable via pivoted links 132 at each stroke which the piston rods 131 perform by means of the hydraulic cylinders 130. The outer sleeve 133 in a known manner is provided with splines with a gap between the splines. An intermediate sleeve, which is not shown, can be manouevered vertically in order to bring the splined outer sleeve into and out of engagement with splines of the rotational shaft 108 in the lower end thereof in the region of said motion members 7. By means of motion members 7 of this kind, large turning forces can be generated, which are required for the indexing of the turntable 30.

Figure 3:
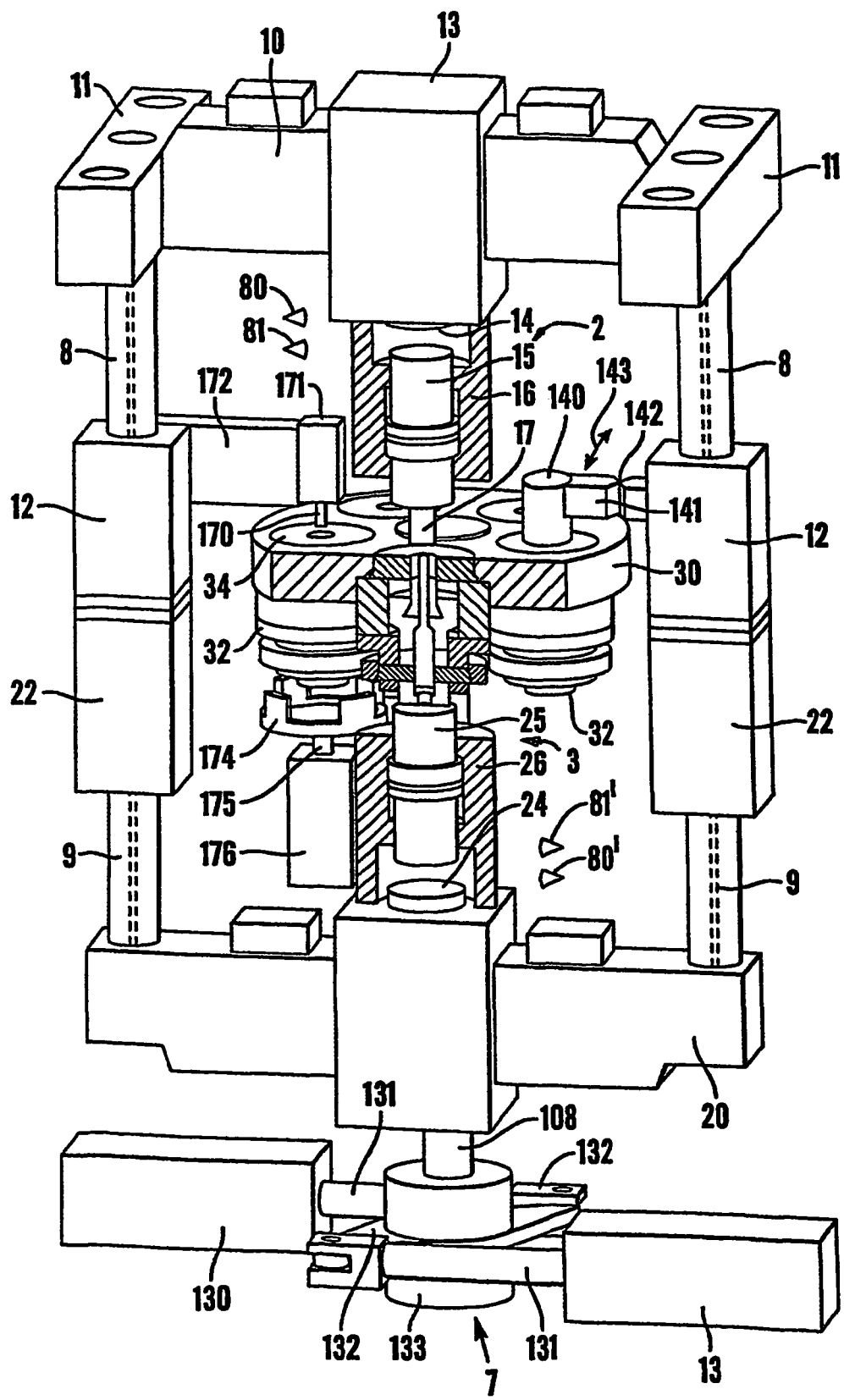
FIG. 3 is a perspective view in the same direction as FIG. 1, illustrating the impact units and
the central unit of the impact machine with its various function stations with auxiliary equipment and motion members of said units.
Figure 4:
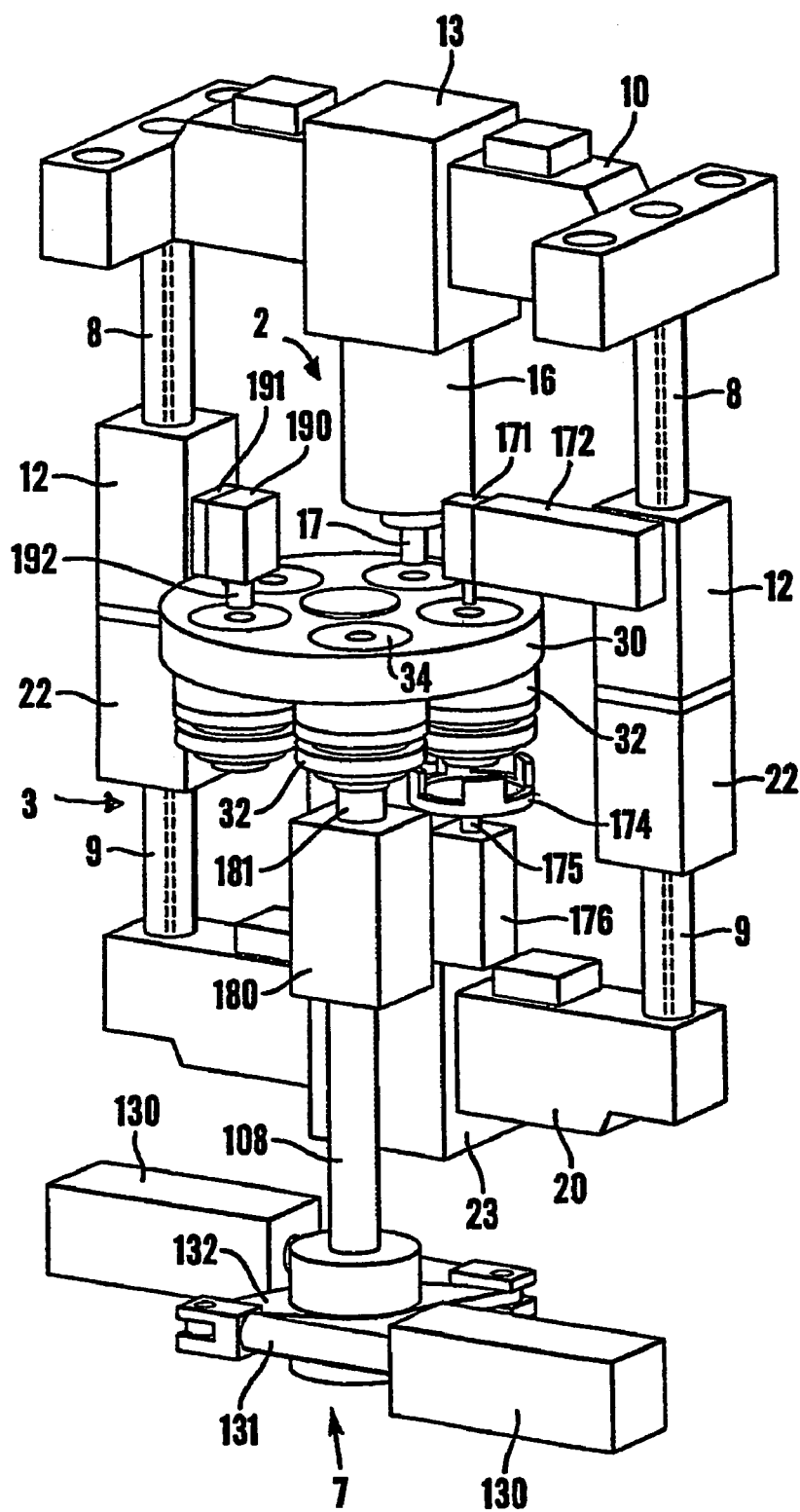
FIG. 4 shows said units, equipment components, and motion members according to FIG. 3 in a perspective view in the opposite direction.
Figure 5:
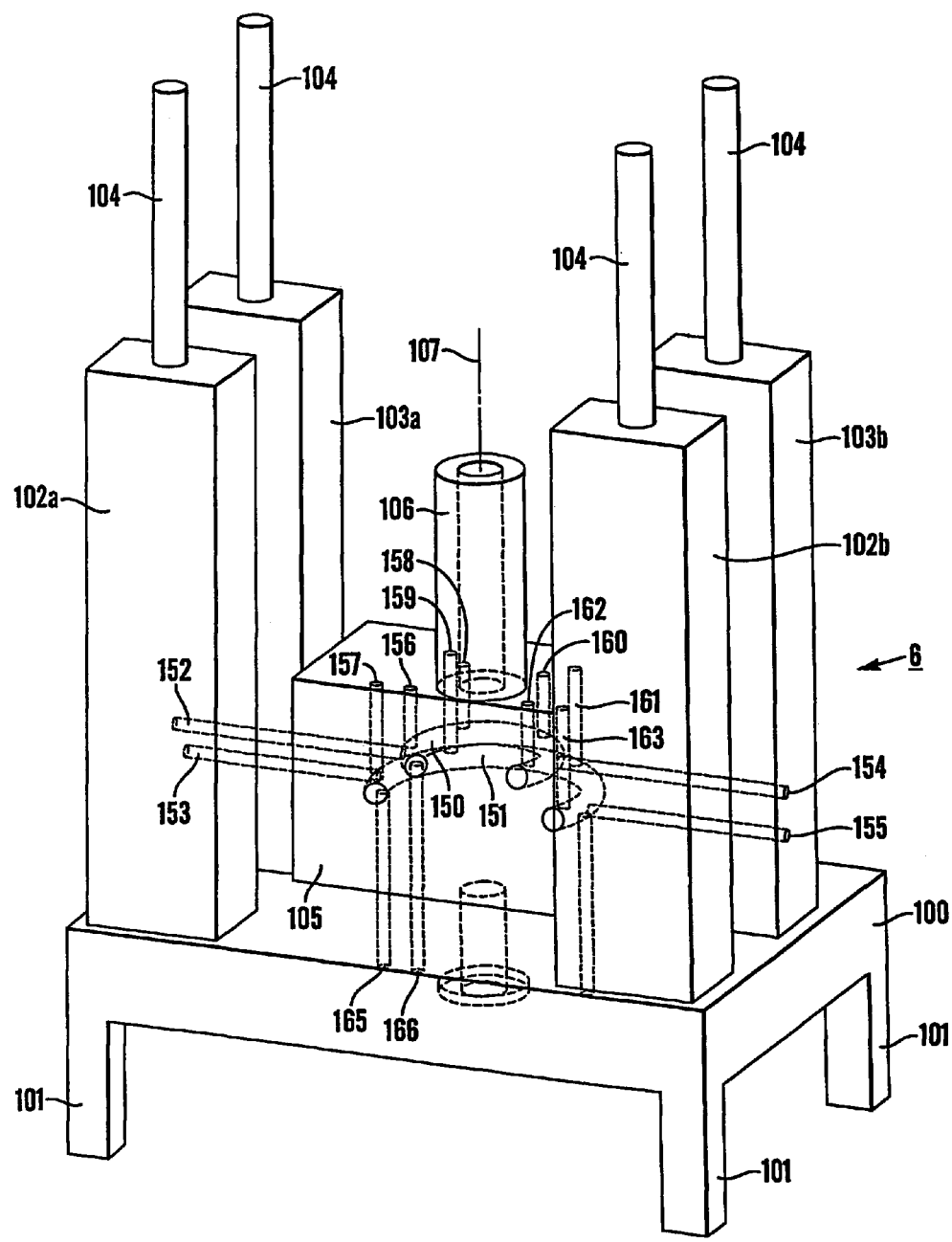
FIG. 5 is a view in about the same direction as in FIG. 1, showing a machine stand which is included in the machine.

The upper impact unit 2, FIGS. 3 and 4, comprises a yoke 10, which via a pair of piston rods 8 can be raised and lowered by means of a pair of upper, hydraulic lifting cylinders 12, which are provided between and reliably attached to the columns 102a and 103a; and 102b and 103b, respectively. The yoke 10, in the ends thereof has a pair of side arms 11, which are angled in two opposite directions and have through, vertical borings, which match the guides 104 which extend upwards from the four columns 102a-103b. The guides 104 guide the yoke 10 and thus the entire upper impact unit 2. For the achievement of a good lateral stability of the impact unit however, also the columns 102a-103b, which secure the upper hydraulic cylinders 12, have great importance.

The yoke 10 carries an upper, hydraulic impact cylinder 13, which is united with the yoke, said impact cylinder containing an upper ram in the form of an impact piston 14. An upper impact body designated 15 is movable in an upper impact body cylinder 16. An upper punch 17 is replaceably united with the impact body 15. The upper impact body cylinder 16 is secured to the upper impact cylinder 13.

The lower impact unit 3 comprises a lower yoke 20, which is suspended in a pair of piston rods 9, which can be raised and lowered by means of a pair of lower, hydraulic lifting cylinders 22, which in the same way as the upper lifting cylinders 12 are provided between the stand columns 102a and 103a; and between the columns 102b and 103b, respectively, and reliably united with said columns. The yoke 20 contacts the inner sides of the columns 102a and 103a; and the columns 102b and 103b, respectively, and can slide against said sides, which contributes to a desired lateral stability of also the lower impact unit 3. The yoke 20 carries a lower, hydraulic impact cylinder 23, which is united with the yoke, said impact cylinder 23 containing a lower ram in the form of an impact piston 24. A lower impact body designated 25 is movable in a lower impact body cylinder 26 which is secured to the impact cylinder 23.

Figure 9:
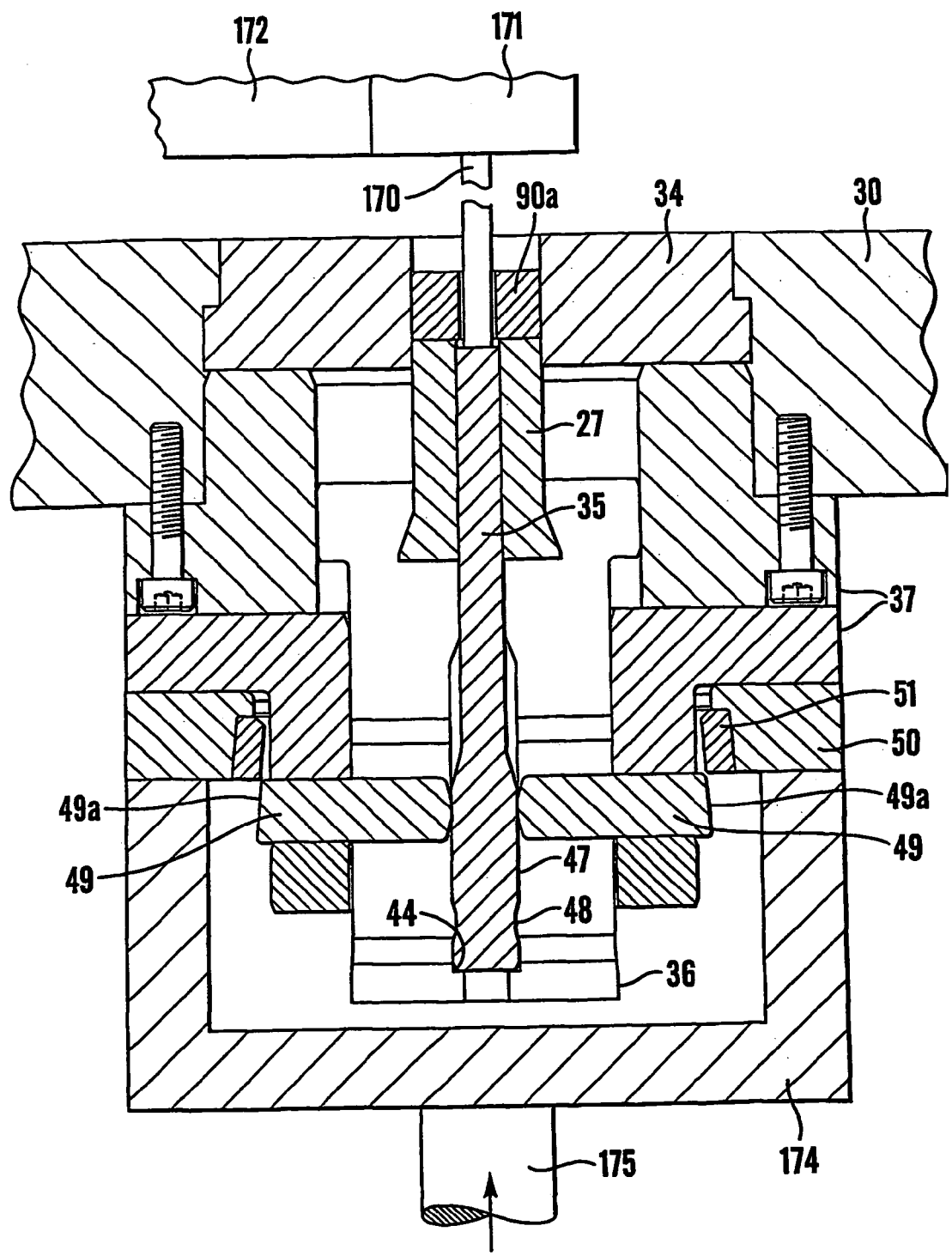
FIG. 9 shows a tool unit in cross-section in another one of the forming stations.
Figure 11:
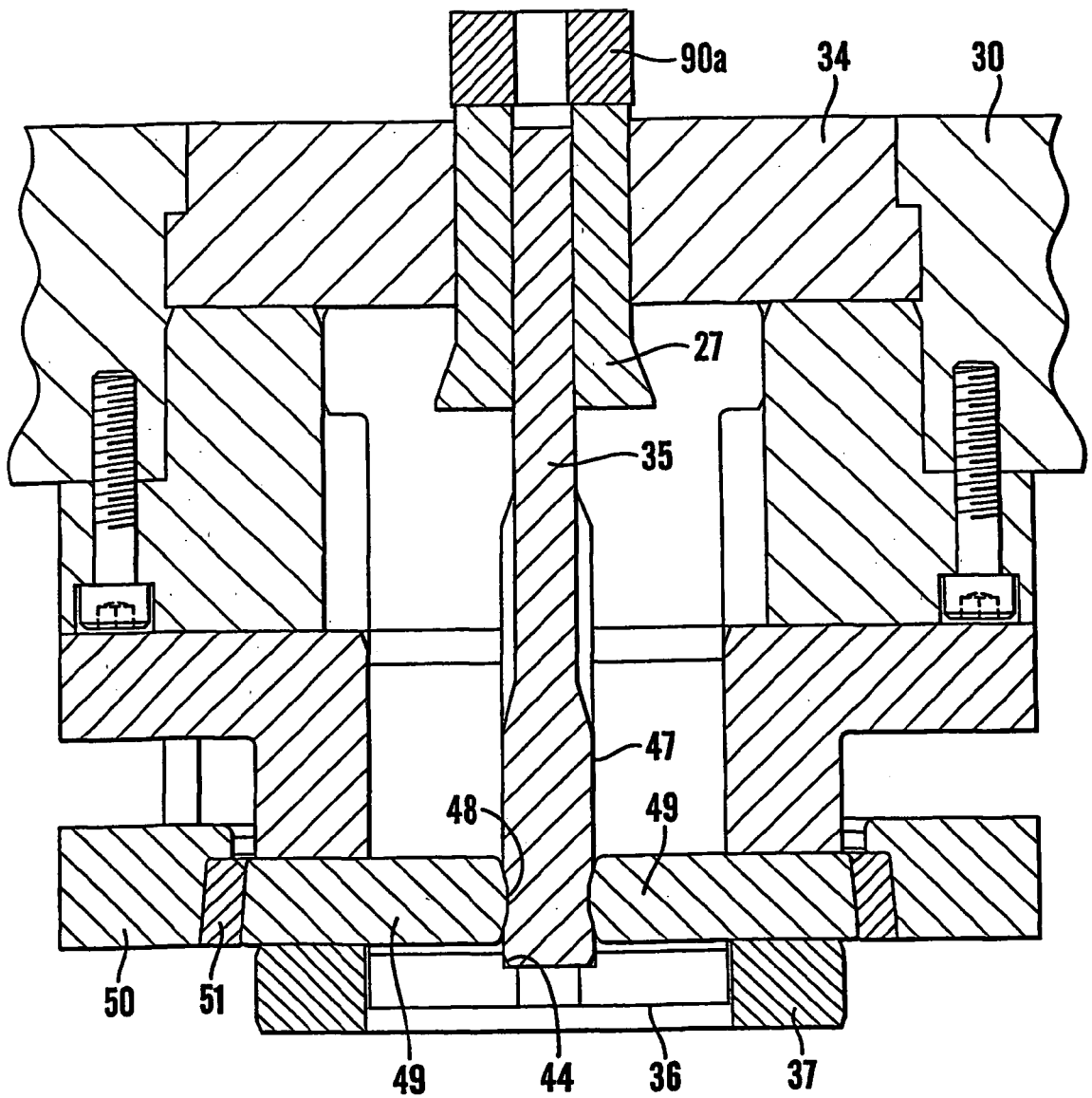
FIG. 11 shows the tool unit in cross-section in still another one of function stations.

As has already been mentioned the table 30 contains and carries five identical tool units 32. One such unit according to a first preferred embodiment is shown in detail in FIGS. 6, 7, 9, and 11. FIG. 7 shows the tool unit as appearing in the re-setting station V after re-setting and in the station I prior to supplying the working material according to a mode of operating the machine 1. In FIG. 9 the tool unit is shown in the mandrel driving down station III, and FIG. 11 shows the tool unit in the ejection station IV after ejection of a formed body.

The main parts of the tool units 32 comprise a lower, tubular punch 27, a die 34, a lower punch holder 36, which is slideably movable in a punch holder guide 37, and a mandrel 35. Due to the fact that the lower punch 27 is tubular, like the upper punch 17, and due to the fact that the tool unit comprises a mandrel 35, it is possible to manufacture products having a through hole, such as gears, in the impact machine 1.

Figure 6:
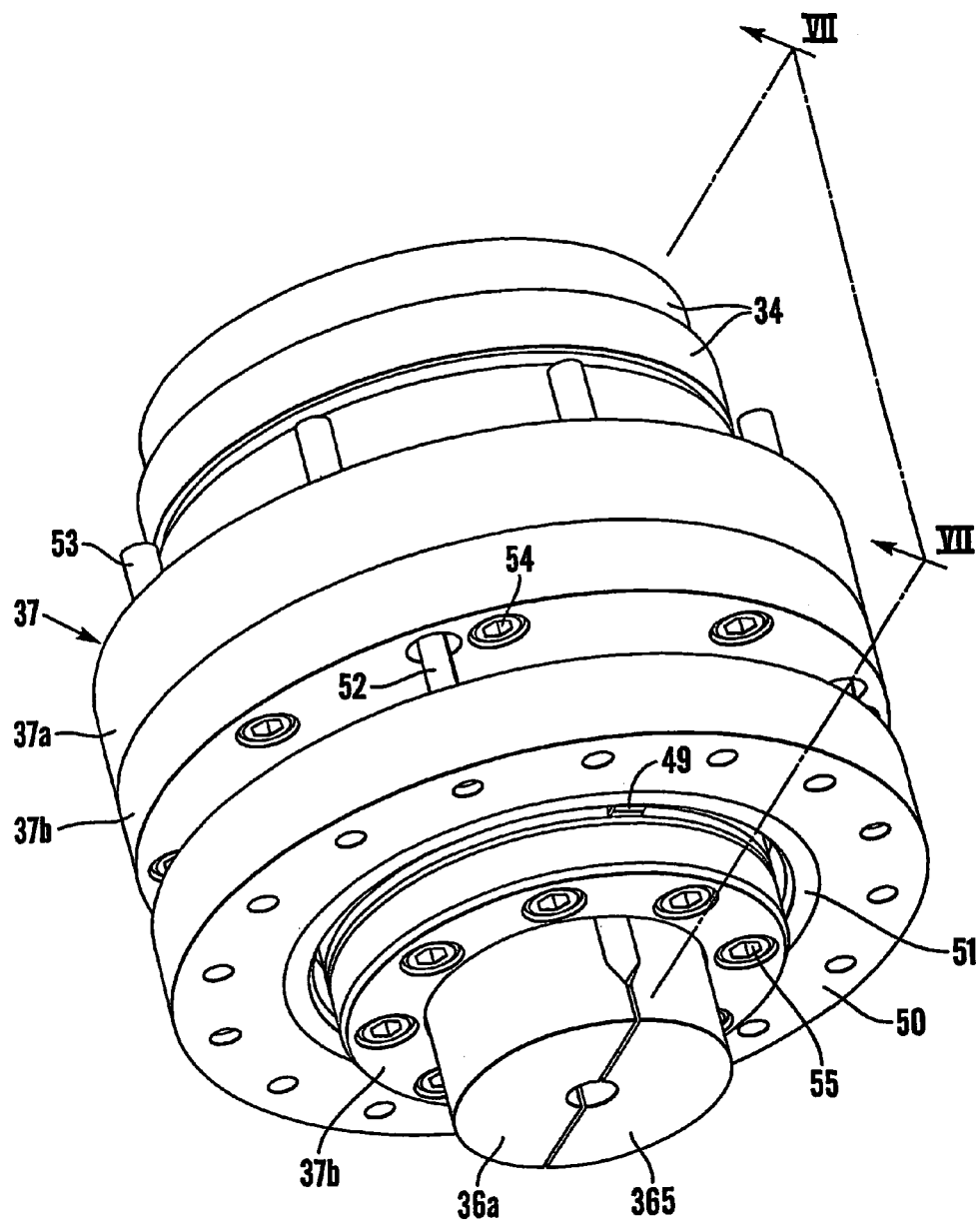
FIG. 6 is a perspective view showing five tool units, which are carried by the central unit in the machine.
Figure 7:
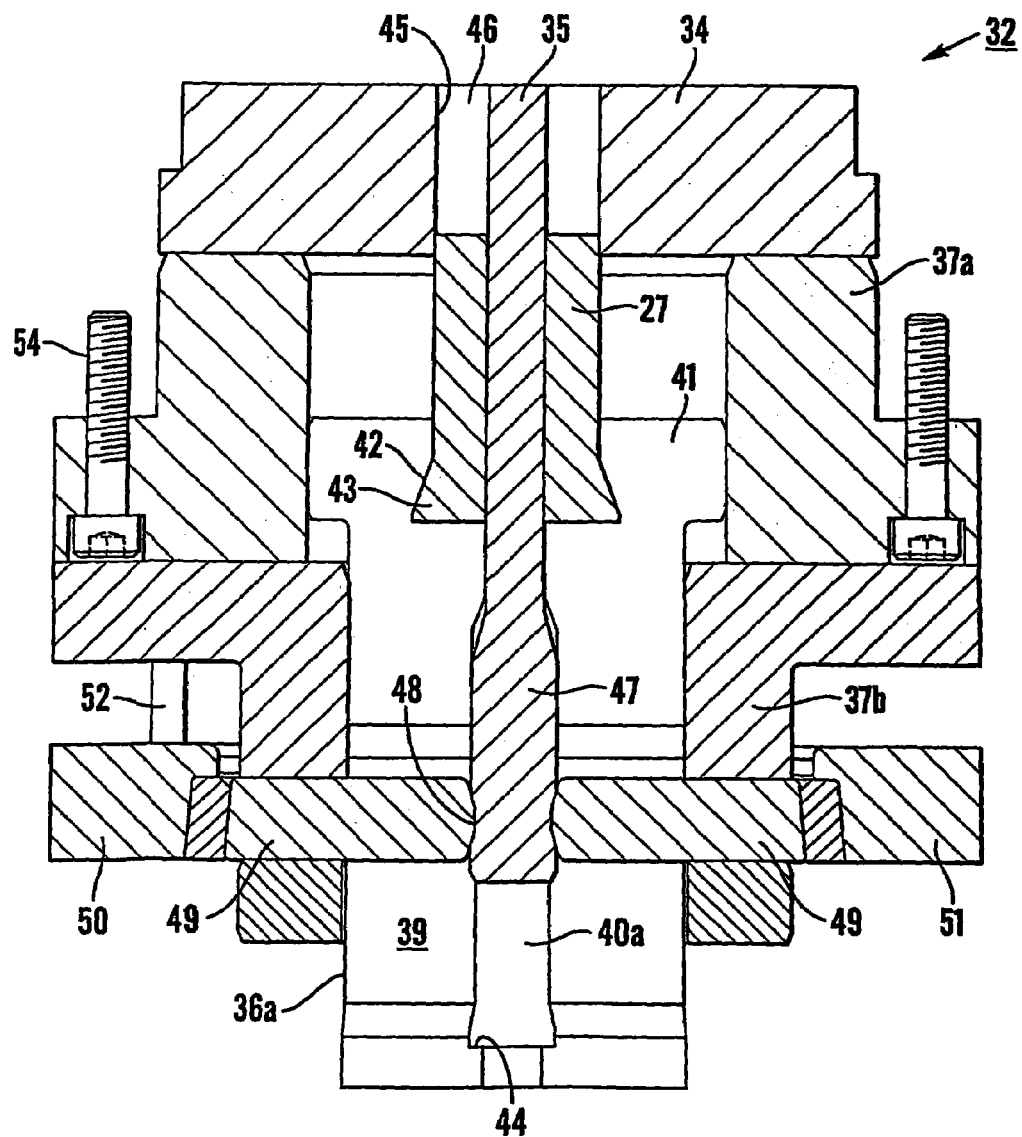
FIG. 7 shows a tool unit in cross section in a view along the line VII-VII in FIG. 6.

The lower punch holder 36, FIG. 6 and FIG. 7, consists of two identical halves 36a and 36b, which are pressed to nearly abut one another along a vertical parting plane, in the region of the upper part of the punch holder extending almost half the length of the punch holder, and in a lower part having a short vertical extension. Between these upper and lower parts, the two halves of the punch holder are milled to form a vertical, through groove 39 having a substantial extension in the vertical direction. There is also a vertical, central groove in each punch holder half 36a and 36b, such as the groove 40a in the punch holder half 36a. The opposite groove 40b in the punch holder half 36b is not shown in any drawing. In the bottom of the grooves 40a/40b there is an abutment surface 44, which has the shape of a shelf. In combination, the grooves 39 and 40a/40b allow the punch holder 36 to move in a vertical direction relative to the mandrel 35. In its upper part, each punch holder half 36a and 36b has an outwardly directed flange 41 and a central recess 42, which widens in its bottom part in order to accommodate a head 43 in the lower end of the lower punch 27, which head is correspondingly shaped. Together, the two punch holder halves 36a and 36b retain the lower punch 27.

The illustrated example concerns, as mentioned, the manufacturing of products having a through hole, such as gears. Therefore, the lower punch 27 is tubular, and the mandrel 35 extends through the lower punch. In the die 34 there is a through, cylindrical hole 45, the walls of which correspond to the outer shape of the desired product, e.g. a gear. The shape of the hole 45 also corresponds to the outer shape of the lower punch 27 above the head 43 and of the upper punch 17, which like the lower punch 27 has the shape of a tubular sleeve.

The mandrel 35 has an elongated, cylindrical upper part, which extends through the lower punch and up into the mould cavity 46, which is defined by the hole 45 in the die 34 between the two punches 17 and 27. In its lower part the mandrel has a thicker portion, here denominated grip portion 47, which has a circumferential concavity 48.

The punch holder guide 37 consists of an upper part 37a and a lower part 37b. The two parts 37a and 37b have inner surfaces which are cylindrical. The upper part 37a has a larger diameter than the lower part 37b. The parts 37a and 37b function as guides for the flange portion 41 and for the main portion, respectively, of the lower punch holder 36, said portions having a correspondingly cylindrical outer shape. The lower part 37b in combination with the flange portion 41 of the lower punch holder also function as a retainer of the lower punch holder. The two parts 37a and 37b are connected to one-another by boltings 55.

In the lower portion of the lower part 37b of the punch holder guide there are two opposite recesses for a pair of opposite wedges 49, which are pressed into the concavity 48 of the grip portion 47 of the mandrel 35. The press force is obtained by means of a locking ring 50 and bushing ring 51 of polyurethane or any other material having a certain flexibility. The wedges 49 allow some resilience because of friction forces which can be exerted upon the mandrel 35 during the working strokes of the machine in the forming station II.

The main parts of the impact units 2 and 3 have already been described above. Further details of these impact units, which in the forming station II are provided at the side of the rotational shaft 108 of the turntable 30, under and over the turntable 30, and which units and details are included in the other function stations will now be explained. At the same time it will also be explained which functions that are performed in the various stations and how these functions can be carried out. Alternative and/or modified modes of performing the various functions, as well as conceivable modifications of the function station as such, will be explained at the end of the description of how the impact machine 1 is equipped and how it can operate.

I—The Filling Station

In the illustrated example it is supposed that the working material consists of metal powder or other powder material; see the preamble of the description. In its simplest embodiment, the filling device can consist of a filling bucket 140 having the shape of a tube, which can be vertical and be open in its two ends. The lower edge of the filling bucket rests against the die 34 in the tool unit 32 in the filling station I and slides against the upper surface of the turntable 30 during the indexing movements. The filling bucket 140 is mounted on an arm, which extends out from the column 102b, FIG. 1 and FIG. 2. The filling bucket 140 contains a sufficient amount of powder for a major member of forming operations and can periodically be re-filled batch-wise or be re-filled continuously by means of not shown re-filling members. The arm with the filling bucket 140 can be turned aside to and from the tool unit by turning in a hinge by means of motion devices represented by an arrow. The lower punch 27 is in its lower position and the mandrel 35 is in its upper position, FIG. 6, on a level with the flat upper surfaces of the die 34 and of turntable 30, which makes it possible for the filling bucket 140 to function in the intended way. The space 46 in the die hole 45 is filled with powder around the mandrel 35. The filling bucket 140 is turned away by means of said motion devices, and thereafter a not shown lid is placed over the die covering the powder in the space 46, e.g.

by means of a not shown robot, in order that no powder shall splash out of the die during the transportation of the filled die to the forming station II.

II—The Forming Station

In the forming station the powder, which in station I has been filled into the forming cavity, is formed to a consolidated, i.e. united body, having a high density, in a single, counter-directed stroke of the two impact units 2 and 3, the parts of which have been described above, and which are provided at the side of the centre of rotation 107 of the turnable 30.

The impact units 2 and 3 will now be described more in detail and also how they work in co-operation with the tool unit 32.

Figure 8A:
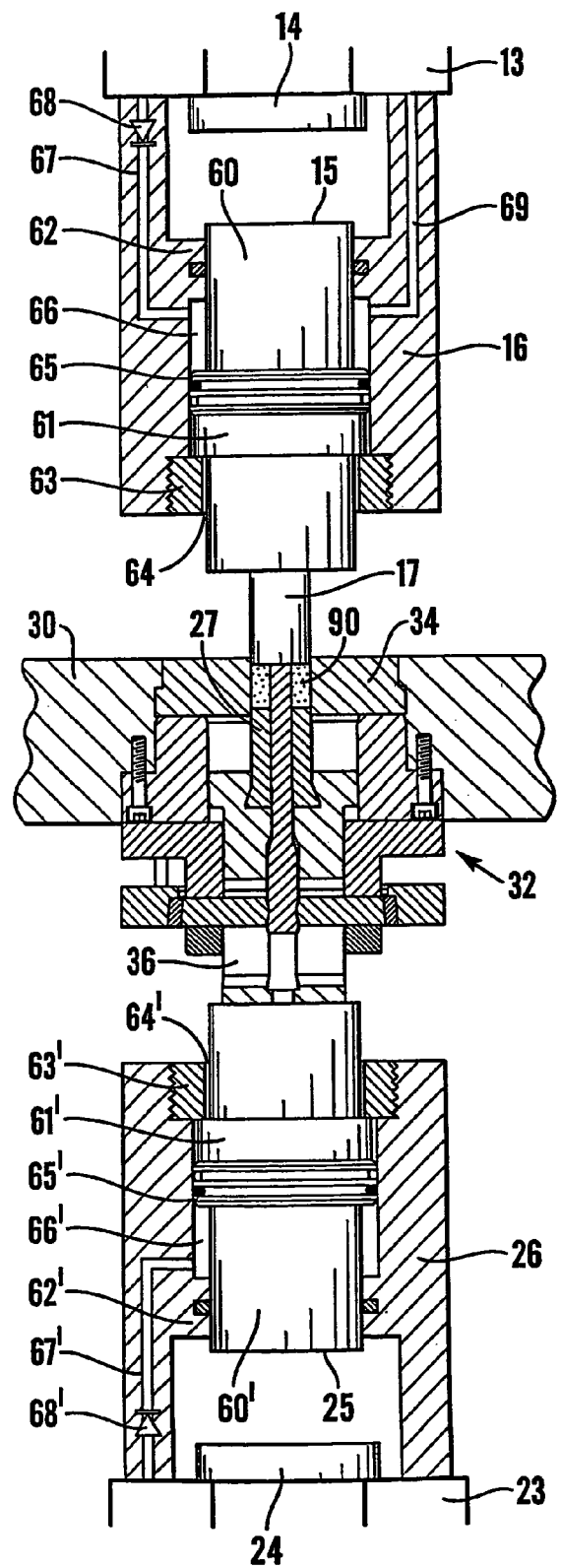
FIGS. 8A and 8B show parts of an upper and a lower impact unit, and a portion of a tool unit in the forming station at two different moments before the forming operation.

The upper impact body 15, FIG. 8A, consists of a through, cylindrical piston rod 60 having a fixed ring 61. The piston rod 60 is sealingly slidable in an opening in an upper end wall 62 of the upper impact body cylinder 16. In a lower end wall 63 there is a wider opening 64, through which the cylindrical piston rod 60 of the impact body 15 can be moved without any sealing. The fixed ring 61 has a diameter which is slightly smaller than the inner diameter of the impact body cylinder 16, i.e. the fixed ring 61 does not sealingly contact the inside of the cylinder. Above the fixed ring 61, on the other hand, there is a movable ring 65, which can move relative to the piston rod 60, and which is sealed against the inner surface of the impact body cylinder 16, either directly or via one or more sealing rings. Also the inner surface of the movable ring 65 is sealed against the piston rod 60, either through a directly sealing contact or via any not shown sealing ring.

Above the movable ring 65 there is a hydraulic chamber 66, which can be connected to said pressure source of hydraulic fluid via any of conduits 152 and 154 and connection conduits, e.g. via any of the piston rods 8 and the yoke 10, to a hydraulic conduit 67, in which there is a non-return valve 68 and a pressure reducing, not shown valve, and to tank or accumulator via a hydraulic conduit 69, in which there is a not shown pressure restricting valve, and connection conduits, e.g. through the yoke and any of the piston rods 8 back to any of the conduits 153 and 154.

Figure 8B:
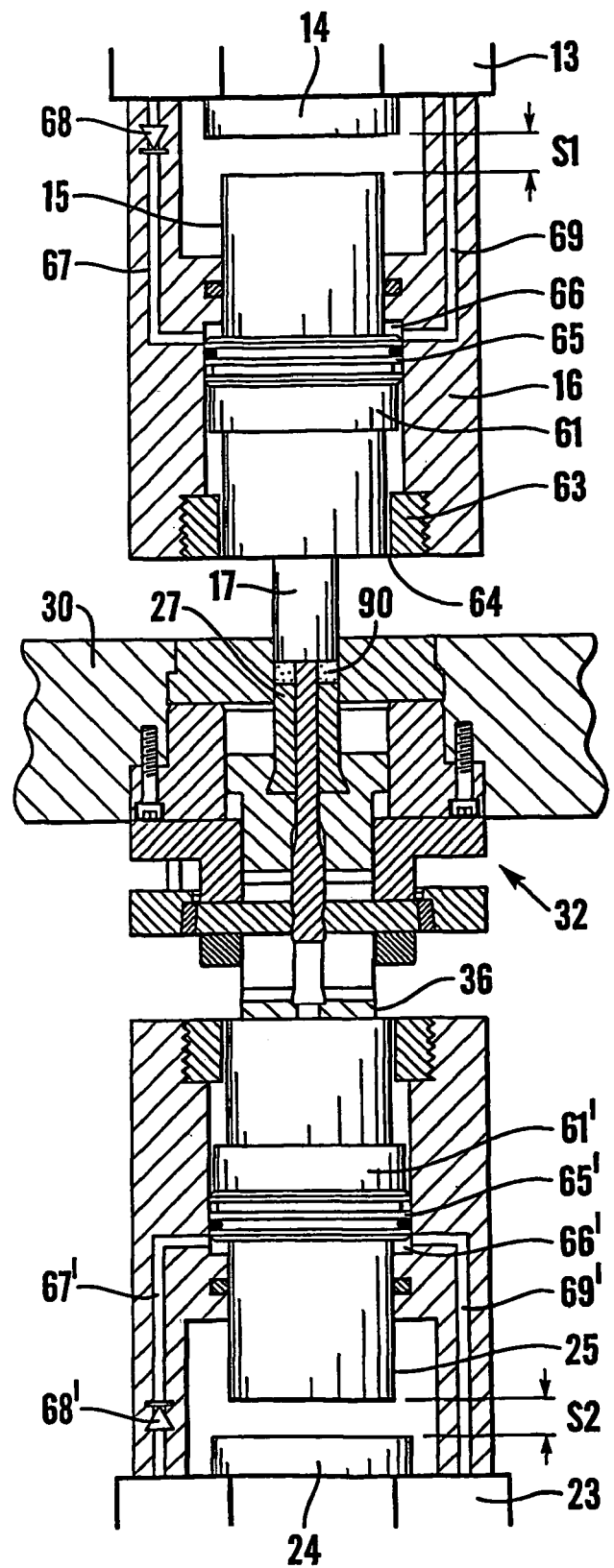

The lower impact body 25 and its impact body cylinder 26 are designed in identically the same way as the upper impact body 15 and the impact body cylinder 16, respectively, with the exception of the lower punch 27 which is not directly fastened to the impact body, as is the case with the upper punch 17 in the upper impact body 15. In FIGS. 8A and 8B the various details of the impact body 25 and the impact body cylinder 26 have the same reference numerals as the details of the upper impact body 15 and the impact body cylinder 16, with the addition of the sign'. Any further description of these details will not be made here, but instead is referred to the above description of the upper impact body 15 and its impact body cylinder 16. As far as the terminology is concerned, it shall, however, be mentioned that the end walls 62' and 63' of the lower impact cylinder 26 shall be denominated lower end wall and upper end wall, respectively. The supply and drainage of hydraulic fluid can be performed in a manner which is analogous with that which has been mentioned in connection with the upper impact unit.

The equipment also includes control and operating devices for the described, movable units, including position sensors 80, 80' for the impact cylinders 13 and 23, respectively, and thus also for the rams 14 and 24, respectively, and position sensors 81 and 81' for the impact bodies 15 and 25, respectively. Said sensors are connected to and transmit information about the position of said units to a central coil unit, which comprises computers and auxiliary devices, which are not described here.

The described equipment works in the following way. In the forming station I the space 46 in the die hole 45, FIG. 7, has been filled with working material 90 around the mandrel 35 and has been covered by a lid. The working material 90 may consist of for example a ring of metal, a polymeric material or a composite material, which can include a ceramic or any other formable material, but in the example it is presumed that the working material consists of a metal powder, or possibly a combination of metal and ceramic powders.

When the turntable 30 has been turned about 72°, so that a tool unit 32 with its space 46 filled with powder has been stepped forward—been indexed—from the filling station I to the forming station II, the wedge 116, FIG. 10, is moved into the wedge shaped recess 115 in the turntable 30, wherein the tool unit 32 is positioned with very great accuracy concentrically with the upper punch 17 and with the lower punch 27. At the same time and/or immediately thereafter, the lower yoke 20 is moved upwards by means of the lower lifting cylinders 22 and the piston rods 9, transporting the lower impact body cylinder 23 and its impact body 25, until the impact body 25 has been brought to contact the bottom surface of the lower punch holder 36, FIG. 8A. At the latest at this moment, the lid on top of the powder in the mould cavity is removed, which can be carried out by means of the same robot that has put on the lid in the foregoing station. Then the upper yoke 10 by means of the upper lifting cylinders 12 and the piston rods 8, bringing with them the upper impact body cylinder 16 and its impact body 15 so far that the upper, tubular punch 17 is brought down to contact the metal powder 90 in the mould cavity 46 and begins to compress the powder until the pressure in the hydraulic chamber 66 reaches a certain, predetermined value. The movement then is stopped and the position is maintained. The lower punch 27 at this stage is in the position shown in FIG. 8A, positioned by the lower impact unit 3, and provides the holding-up force.

The yoke 20 now starts moving upwards by means of the lifting cylinders 22, wherein the lower punch is pressed upwards against the powder 90. The movement continues until the pressure in the hydraulic chamber 66' has reached a certain, predetermined value. This pressure then has also been transmitted to the hydraulic chamber 66 of the upper impact unit via the powder 90. The powder therein has been pre-compacted and centre in the mould cavity 46 in the die 34. The impact bodies 15/25, the hydraulic cylinders 16/26 and the punches 17/27 now are in the positions shown in FIG. 8A.

The next operation aims at setting the stroke lengths S1 and S2 of the rams 14 and 24, i.e. the distance between the upper ram 14 and the upper impact body 15, and between the lower ram 24 and the lower impact body 25, respectively, before the striking operation. The setting can be carried out simultaneously for the upper 2 and the lower 3 impact unit by pressing the yokes 10 and 20 further downwards and upwards, respectively, by means of the hydraulic cylinders 12 and 22, respectively. The pre-compacted powder 90 herein exerts a counter-pressure on the punches 17 and 27, wherein the pressure in the hydraulic chambers 66 and 66' is increased further. The overpressure is relieved through the hydraulic conduits 69 and 69'. The punches 17 and 27 therefore will remain in their positions, while, the impact pistons/rams 14 and 24 approach the impact bodies 15 and 25, until their correct stroke lengths S1 and S2, FIG. 2B, are achieved, which is detected by the upper and lower position sensors 80, 81 and 80', 81', respectively. The pressure difference between the lower and upper hydraulic chambers 66' and 66 herein is provided to be so small that it will not have any influence on the stroke lengths to any non-negligible degree.

When the intended stroke lengths S1 and S2 thus have been achieved, the flange 61 and the ring 65 of the upper impact body 15 are in an upper position, and the flange 61' and the ring 65' of the lower impact body 25 are in an upper position and a lower position in the hydraulic cylinders 16 and 26, respectively, FIG. 8B. The impact machine is now ready to consolidate the powder 90 for forming the desired article through a single, simultaneous stroke by the two rams 14 and 24 in a direction towards one another. At the latest at this moment, the wedge 116 is withdrawn from the wedge shaped recess 115 into the plate 109, and also the locking bolts 119 and 122, which have been engaged in their respective recesses 118 and 121, are withdrawn into their resting positions in the plate 109, before the rams perform their strokes in the forming station II.

The distances S1 and S2 are the travels of acceleration of the rams/impact piston 14 and 24, and are chosen under consideration of in the first place the masses of the rams and the impact bodies such that the total mass $m_1$ of the upper ram 14, the upper impact body 15 and the upper punch 17 will obtain a downwards directed velocity $v_1$ when the ram 14 has hit the impact body 15, and the total mass $m_2$ of the lower ram 14, the lower impact body 25, the lower punch 27 and the lower punch holder 36 obtain an upwards directed velocity $v_2$ when the ram has hit the impact body, wherein the masses and the velocities are so large that the momentums (the quantities of motion) of the masses that move downwards and upwards, respectively, are essentially equal, i.e. so that the following condition applies:

$$m_1 \times v_1 = m_2 \times v_2$$

The upper ram 14, which according to the embodiment has a substantially larger mass than the upper impact body 15, thus strikes the upper impact body 15 with a very high velocity, at the same time as the lower ram 24, which according to the embodiment also has a much larger mass than the lower impact body 25, strikes with a very high velocity on the lower impact body 25. The kinetic energies of the moving masses, which are very high, are transferred via the upper punch 17 and the lower punch 27 to the powder 90. The rams 14 and 24 perform only one stroke, but the kinetic energies which essentially are transferred to the metal powder 90 in the mould cavity 46 are so large that the powder is plasticised, wherein it will flow out and fill the mould cavity and in a millisecond or so form a consolidated body with desired shape. The pressure pulse that arises in the mould cavity because of the single stroke of the rams against the impact body has a duration which is shorter than 0.001 second but has a magnitude lying in the range 1-10 GPa, typically in the range 1.5-5 GPa. Because of the high pressure and the plasticizing caused by the high pressure, probably also the friction between the working material/the powder and the walls of the mould cavity is reduced, as well as between the powder grains, which commutes to, or is a prerequisite for the ability of the material to flow out and to fill all parts of the mould cavity. At the impact the mandrel 35 is essentially stationary relative to the die 34, as well as during the pre-compaction of the powder which is possible because the lower punch holder is movable relative to the mandrel, which is held by the wedges 49 in the slot 39 in the punch holder.

It should be observed that the impact bodies 15 and 25 do not hit the turntable 30 in the central unit 4 at the forming operation, but strike against the upper punch 17 and against the lower punch holder 36, respectively, and via the latter one against the lower punch 27. The upper punch 17 and the lower punch 27 are movable in the die 34, and the lower punch holder 36 is movable in the punch holder guide 37 in the tool unit 32 in forming station II. It is true that the movable units 17, 27, and 36, as well as the working material 90 in the mould cavity cause some friction against the bordering walls in the tool unit, but these friction forces substantially neutralize one another. A certain resulting force, however, can be transferred to the turntable 32, which therefore can move a little—shake—in the vertical direction at the impact. In order to allow such vertical, minor movements, the table 30 is released from the plate 109, and the table's 30 connection to the rotational shaft 108 also is designed such, e.g. via a spline coupling, that the table can move freely a short distance in the vertical direction during the stroke.

At the same time as the desired body is formed almost instantaneously, because masses with essentially equally large impulses strike from opposite directions against the working material, the generation of shock waves of such magnitude that they could damage the turntable 30 and other components of the machine is prohibited, and it is also essentially prevented that the kinetic energy of the movable masses is transferred to and is lost in the machine and its foundation. This is due to the fact that those shock waves which may arise, will be counter-directed, wherefore they to an essential degree neutralize one another. Moreover, the hydraulic medium in the lifting cylinders 12 and 22 dampen those shock waves which possibly remain and which propagate in the direction of the machine stand towards the foundation 5. Through superposition of the impact waves, which are generated by the two simultaneously working impact units, also the forming and compaction effect of the strokes are enhanced. These conditions make it possible to design the entire machine, including the turntable 30 so light as is illustrated by the example. Not the least important is it that the turntable 30, including the tool units 32, is sufficiently light in order to facilitate a quick indexing, which is a prerequisite for a high working capacity of the machine 1, something which is achieved through the invention.

When the rams at a high velocity strike the impact bodies 15 and 25, respectively, the cylindrical piston rods 60 and 60' of the impact bodies move freely relative to the movable rings 65 and 65', respectively, said rings during the stroke renaming essentially in those positions they had adopted prior to the stroke, FIG. 8B. A small play is created between on one hand the retained movable rings 65 and 65' and on the other hand the flanges 61 and 61', corresponding to the final compaction of the powder 90 in vertical direction at the impact.

As soon as the rams 14 and 24 have performed their simultaneous strokes, they are returned to their starting positions in the upper 13 and the lower impact cylinder 23, respectively. The yokes 10 and 20 are returned to their starting positions by means of the lifting cylinders 12 and 22. Pressure fluid is led to the two hydraulic chambers 66 and 66', so that the movable rings 65 and 65' are pressed downwards and upwards, respectively, to contact the flanges 61 and 61', where after the movable rings press the entire impact bodies 15 and 25 to their starting positions, in which the flanges 61 and 61' contact the end walls 63 and 63', respectively. The working cycle in the forming station II thereby has been completed, where after the tool unit 32, including the formed article, is moved to the next function station through a new rotational movement of the turntable 30.

III—The Mandrel Driving Down Station

The article, which in the forming station II has been formed of powder, is consolidated, i.e. has a high density, essentially without communicating pores, but the individual powder grains, which were softened and deformed during the forming operation, have not yet coalesced, i.e. welded together, at least not to any essential degree. They the consolidated body can be comparatively brittle and should be handled carefully, before it has been pushed out of the die and been heated to a sintering temperature in a subsequent operation, so that the individual powder grains from this treatment are caused to completely coalesce, i.e. to weld together. Among other things, the mandrel 35 for this reason is driven down and out of the formed article, before the body is pushed out of the die, which is not performed until in station IV.

In function station III therefore a mandrel expulsor 170 is provided for driving the mandrel downwards, FIGS. 1, 2 and 9, said expulsor consisting of a vertically oriented rod having a smaller diameter than the hole in the consolidated body 90a. More particularly, the rod/mandrel expulsor 170 consists of a piston rod, or of the end of a piston rod, and can be moved upwards and downwards by means of a hydraulic cylinder 171 on an arm 172, which extends outwards from the column 102a.

The wedges 49 must first be released to enable the mandrel 35 to be driven downwards at the same time as the lower punch 27 is maintained in its position in the die 34. Therefore, also a wedge releaser 174 is provided for that purpose in the mandrel driving down station III, said wedge releaser consisting of a horizontal plate having four upwardly directed projections. The wedge releaser 174 is mounted on a piston rod 175, which extends upwards from a hydraulic cylinder 176, which is mounted on the block 105, which forms part of the stand 6, and communicates with the hydraulic pressure force and with tank via the conduits 156 and 157. On the other hand, the hydraulic cylinder 171 can communicate with the pressure source and tank via the conduits 153 and 154.

The pressing down of the mandrel 35 is suitably performed at the same time as an initial operation is carried out in the forming station II for the next article that shall be formed in that station, i.e. when the lower impact unit 2 has been brought upwards to its staring position for a stroke, when the wedge 116 and the locking bolts 119, 122 are engaged in their functional positions in the wedge shaped recess 115 and in the recesses 118 and 119, respectively.

The mandrel expulsion is initiated by the wedge releaser 174 being pressed upwards by means of the hydraulic cylinder 176, so that the locking ring 50 is pushed maximally upwards to contact the outwards directed flange of the lower part 37b of the punch holder guide 37, FIG. 9. Thence, the wedges 49 are released and can be pressed out from their engagements with the mandrel 35 in the region of the concavity 48.

Thus, when the edges 49 have been released, the rod 170 is pressed down to contact the upper end of the mandrel 35 and pushes the mandrel down through the hole in the formed body 90a, at the same time as the wedges 49 are pressed out of the concavity 49, and thereafter they slide against the grip portion 47 of the mandrel. The end positions of the mandrel and of the wedges are shown in FIG. 9.

Because of built-in compression forces in the body 90a, the body 90 will expand slightly in the region of the central hole of the body, when the mandrel 35 is pushed out of the hole, however, not so much that the body will contact the rod 170, which is being driven downwards. Therefore, the rod 170 now can be brought upwards, back to its upper starting position above the die 34 by means of the hydraulic cylinder 171, which can be carried out at the same time as the wedge releaser 174 is lowered to its lower, inoperative position by means of the hydraulic cylinder 176. This causes the locking ring 50 to drop down by its own weight, such that an initial contact is established between the bushing ring 51, the inner, circumferential surface of which is tapered conically upwards, and matching rear edges 49a of the wedges 49, which are correspondingly shaped.

Now, the operations in the mandrel driving down station III are finished and the wedge 116 and the locking bolts 119 and 122 are returned to their non-operative positions in the plate 109. Thereafter the next body is formed in the forming station II, as has been described above, and the turntable 30 is indexed further about 72° in the clockwise direction by means of the motion devices 7, when the operations in the forming station II are finished. Thus, the tool unit 32, shown in FIG. 9, with the mandrel in its lower position is moved from the mandrel driving down station III to the ejection station IV.

IV—The Ejection Station

In this station a hydraulic cylinder 180 is mounted on the block 105 under the tool unit 32, FIG. 4. The hydraulic cylinder 180 is connected to a pressure source and to a tank via the conduits 158 and 159. A piston rod 181 is a concentric with the tool unit in station IV and forms an ejector rod, which is provided to be pushed upwards towards the under side of the lower punch holder 36, in which the mandrel 35 still is in its bottom position with the lower end of the mandrel abutting the shelves 44 in the lower punch holder, FIG. 9.

The formed product 90a is ejected from the mould cavity 46 in the die 34 by means of the hydraulic cylinder 180 and its ejector rod/piston rod 181 therein that said rod is pressed upwards until the mandrel 35 will be on a level with the upper edge of the die 34, i.e. to its normal position. The lower punch 27 takes part in this movement and has, when the mandrel 35 reaches its upper position on a level with the upper surfaces of the die 34 and of the turntable 30, reached a short distance beyond that level, corresponding to the difference between the levels of the punch 27 and the mandrel 35 in the starting position, FIG. 9. During the upwards directed movements of the lower punch holder 36, the lower punch 27, and the mandrel 35, the grip portion 47 of the mandrel slides against the wedges 49, which in the final moment are re-pressed into the concavity 48 of the mandrel 35 during the influence of the weight of the locking ring 50, which locks the wedges 49 in their locking positions in the region of the concavity 48 through wedge action between the conical inner periphery of the bushing ring 51 and the sloping rear edges 49a of the wedges.

The above operation is performed at the same time as the mandrel 35 is driven down in the next tool unit 32 in the mandrel driving down station III and also at the same time as the initial measures are performed in the forming station II, as have been described in the foregoing. This means that the turntable 30 is fixed and accurately positioned by means of the wedge 116 and the locking bolts 119 and 122, as has been described in the foregoing.

When the lower punch 27 is brought all the way up through the die 34, the formed body 90a is ejected from the die, and will be resting on the upper surface of the lower punch holder 27, FIG. 11, in a slightly expanded condition. It is fetched from the upper surface of the lower punch holder by means of a not shown, robot-manouevered picker and is placed in a suitable container at the side of the machine 1 in order to be heated to a sintering temperature in a subsequent operation so that the powder grains, which have been softened and deformed in station I during the forming operation, will sinter together (coalesce) to form a dense body of high strength.

V—The Re-Setting Station

A hydraulic cylinder 190 is provided in the station V above the turntable 30 on an arm 191, which extends out from the column 103b. A piston rod extends vertically downwards from the hydraulic cylinder 190. In its lower end, said piston rod has a tubular plunge 192, which has a slightly smaller outer diameter than the lower punch 27 and an inner diameter which is slightly larger than the diameter of the mandrel 35. In the station V said plunge 192 is pressed by means of the hydraulic cylinder 190 against the lower punch 27, when the tool unit 32, which has been operated in the ejection station IV, has been brought to the re-setting station V. Thus, the plunge 192 presses the lower punch 27 down into the die 34, moving also the lower punch holder 36 so far that the lower punch and the punch holder 36 will adopt the initial position shown in FIG. 6. The mandrel 35 during this operation is fixedly kept in the tool unit 34 by means of the locking wedges 49. Then, the plunge 192 is returned to its upper starting position by means of the hydraulic cylinder 190. The operations in the re-setting station are performed simultaneously with the driving down of the mandrel in the mandrel driving down station III and with the ejection of the formed body in the ejection station IV, i.e. at the same time as the impact units 2 and 3 are being prepared for the forming operation in the forming station II. This implies that the turntable 30 is fixed during the re-setting operation by means of the wedge 116 and the locking bolts 119 and 122.

In summary, the following operations are performed in the different function stations during the same working phase, i.e. more or less simultaneously depending on how much time is required for their performance, namely the following:

in the filling station I the mould cavity is filled with an intended amount of metal powder or corresponding;

in the forming station II the impact units are prepared for the forming operation, i.e. the movable units are brought to their staring position for a stroke, FIG. 8A;

in the mandrel driving down station III the locking wedges 49 are released and the mandrel is driven down and is released from the formed body;

in the ejection station IV the formed body is pushed out of the die and the mandrel 35 is returned to is normal position; and in the re-setting station V the lower punch 27 and the punch holder 36 are pressed down to their lower starting positions.

During the course of the above described operations, the turntable 30 is secured by means of the wedge 116 and by the locking bolts 118 and 122. This is important because this means that the tool units 32 will be positioned with accuracy, and because it also means that the turntable gets an increased resistance against those forces which the table is subjected to in the mandrel driving down station III, the ejection station IV, and to a certain degree in the re-setting station V, and possibly also in the forming station I. It should also be mentioned in this connection that the hydraulic source and the rest of the hydraulic system are dimensioned such that all the mentioned operations which are performed when the turntable 30 is secured by means of said wedge and locking bolts, can be performed simultaneously.

When the said operations have been carried out in the five function stations, while the turntable 30 is secured by means of said wedge and locking bolts, the wedge 116 and the locking bolts 119 and 122 are returned to their non-operative positions in the plate 109.

Not until the above operations have been performed, the said upper impact unit 2 and said lower impact unit 3 simultaneously perform their strokes and form the body in the mould cavity in a way which has been described above. This has the advantage that all available hydraulic power can be led to the impact cylinders 13 and 23 and thus be mobilized for the very heavy strokes which the respective upper and lower rams 14 and 24 perform.

Modifications of the Function Stations and of their Functions

The modifications which will be explained in the following concern devices intended to be active when the turntable 30 has been secured with the tool units 32 in the various function stations by means of, according to the illustrated embodiment, the wedge 116 and the locking bolts 119 and 122. It should however be mentioned that also other devices can be employed for the achievement of an exact positioning and an adequate support of the turntable during the performance of these operations. The modifications, however, do not concern the impact units 2 and 3, nor how the forming operation is carried out, when the turntable 30 has been released from said positioning and locking devices. This, on the other hand, does not mean that modifications of the impact units and of their mode operation can also be conceived within the scope of the basic principles of the invention.

In the filling station I, powder or one or more blanks may be filled into the mould cavity by means of other filling devices than a filling bucket. E.g. a proper amount of powder can be measured and be pressed into the mould cavity in the die, in which the lower punch stands in its lower starting position, whereupon a lid is caused to cover the die. One can also conceive that the lower punch stands in a lower position, the mould cavity in the die is overfilled by means of the filling bucket, the lower punch is brought up to its correct starting position, the filling bucket is turned aside, and the lower punch is moved down to its lower position again. Another alternative is that the lower punch 26 has adopted an upper position and is drawn down against a hydraulic stop to suck powder down into the die, whereupon the filling bucket is turned aside, the lid is caused to cover the die, and the lower punch is moved down to the lower position. If the working material does not consist of powder but of a solid body, the body is suitably placed in the die by means of a robot. The above modifications naturally require that the filling station is provided with necessary facilities, which may be of a kind known per se or which do not necessarily require inventiveness.

Still another alternative is that normally no operation at all is performed in station I, which instead is a service station; possibly a lubricant may be supplied to the mould cavity. In this case one can conceive that the working material, whether this consists of a powder or a solid body, is supplied to the mould cavity in the forming station II. It is true that this adds some time to the time required for the other measures that shall be performed in the forming station, but, when it is the matter of a powder, this alternative on the other hand has the advantage that the die need not be covered by a lid, since there is no powder in the mould cavity which can splash out, when the table is turned from a foregoing station to the forming station.

The measures performed in the mandrel driving down station III of course require that the impact machine 1 and its tool units 32 are adapted for the manufacturing of annular bodies. This is an important application but in no way the only one possible for the impact machine 1. Also non-annular bodies can be manufactured, such as a lot of machine elements, studs, etc., which do not necessarily have a circular-cylindrical shape. The machine 1, however, is particularly suited for large scale manufacturing of rather small objects. When it is the matter of manufacturing non-annular bodies, there is of course no need for the mandrel 35, and the upper punch 16 and the lower punch 26 are replaced by punches which are not tubular, fitting in matching dies, which are also replaceable. Also the wedges are removed, but in other respects the tool units 32 in principle may have the same design as is shown in the drawings and described in the foregoing. The formed body in this case is not subjected to any action in the mandrel driving down station III, but is further conveyed to the next station, the ejection station IV. Alternatively, the ejection of the formed product in this case can be carried out in station III, where the piston rod 175 can be used for moving the lower punch holder and the lower punch upwards in the modified tool unit, in principle in the same way as the ejector functions in the ejection station IV according to the foregoing.

The ejection station IV and the re-setting station V in principle may be combined with one another, i.e. be provided with ejector devices, devices for removing the ejected body, and devices for returning the lower punch to a desired low position. The operational sequence may the be the following. First the formed body is pushed out from the die, as has been described in connection with the description of the ejection station IV. Then the ejected body is removed by means of a picker or in any other mode, and finally the lower punch is returned to its lower position in a way that has been described in the foregoing in connection with the description of the measures performed in the re-setting station V. This alternative has the advantage that the re-setting station V will be unemployed and can be used as a service station. Such service may consist e.g. of replacement of tools in the tool units, which is easier to carry out if the station does not contain any devices which are in the way for that kind of work. On the other hand, it takes of course a longer time to first eject the product and then press down the lower punch to its lower position than to perform those operations simultaneously in two different stations. If this implies that the sequential ejection and re-setting operations in one and the same station takes a longer time than to prepare the impact units 2 and 3 for the forming operation in the forming station II. A which normally determines the working pace of the machine 1, so that the working speed of the machine is retarded, the original alternative is preferable, i.e. to perform ejection and re-setting in two different stations. The alternative that is most convenient from a manufactured capacity point of view can be determined from case to case, which illustrates the adaptability of the machine 1 to different situations, where the type of product to be manufactured may have great importance. It can for example take longer time to carefully push out a comparatively large body with a more complicated shape than a small body with a simple geometry.

Also a straightforward technique for removing those bodies which successively are ejected out of the die should be mentioned, namely to simply provide an arm which extends obliquely above the tunable 30 between the ejection station IV and the re-setting station V. When the turntable 30 is rotated, such an arm, even when it is completely stationary, will move the body to be collected in a suitable container. In view of the fact that the formed bodies can be rather brittle, this solution, however, possibly may be jeopardising, not only because of the action of the removing arm but also because of the shakings which the turntable 30 can be subjected to during the forming operation in the forming station II, when the table is released from said fixation and locking devices.

Embodiment According to FIGS. 12-16

Figure 12:
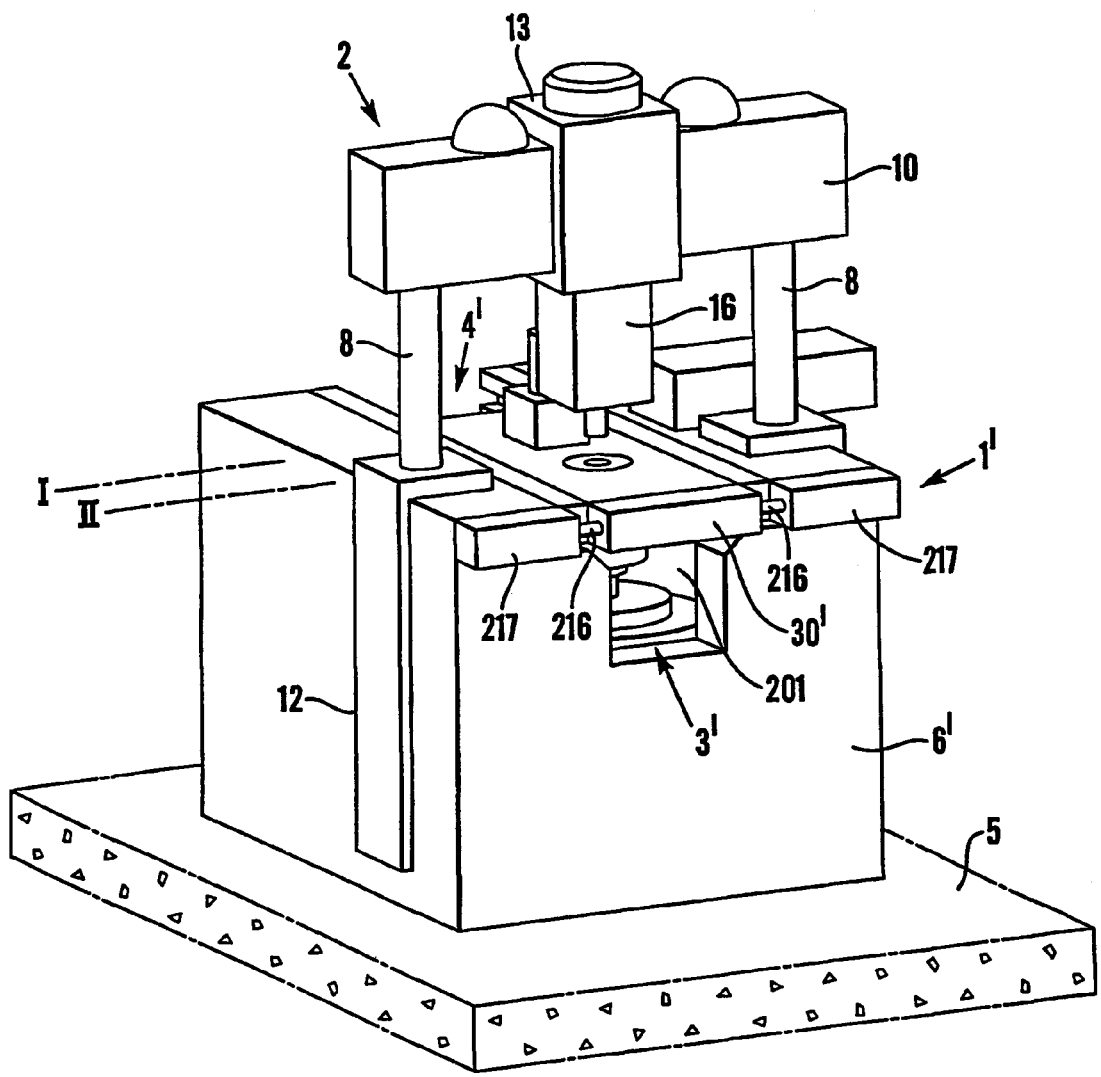
FIG. 12 and FIG. 13 show a lay-out of an impact machine according to a second embodiment in two different perspective views, which impact machine comprises an upper ram above said central unit and a counter-impact member in the form of a movable anvil under the central unit.
Figure 13:
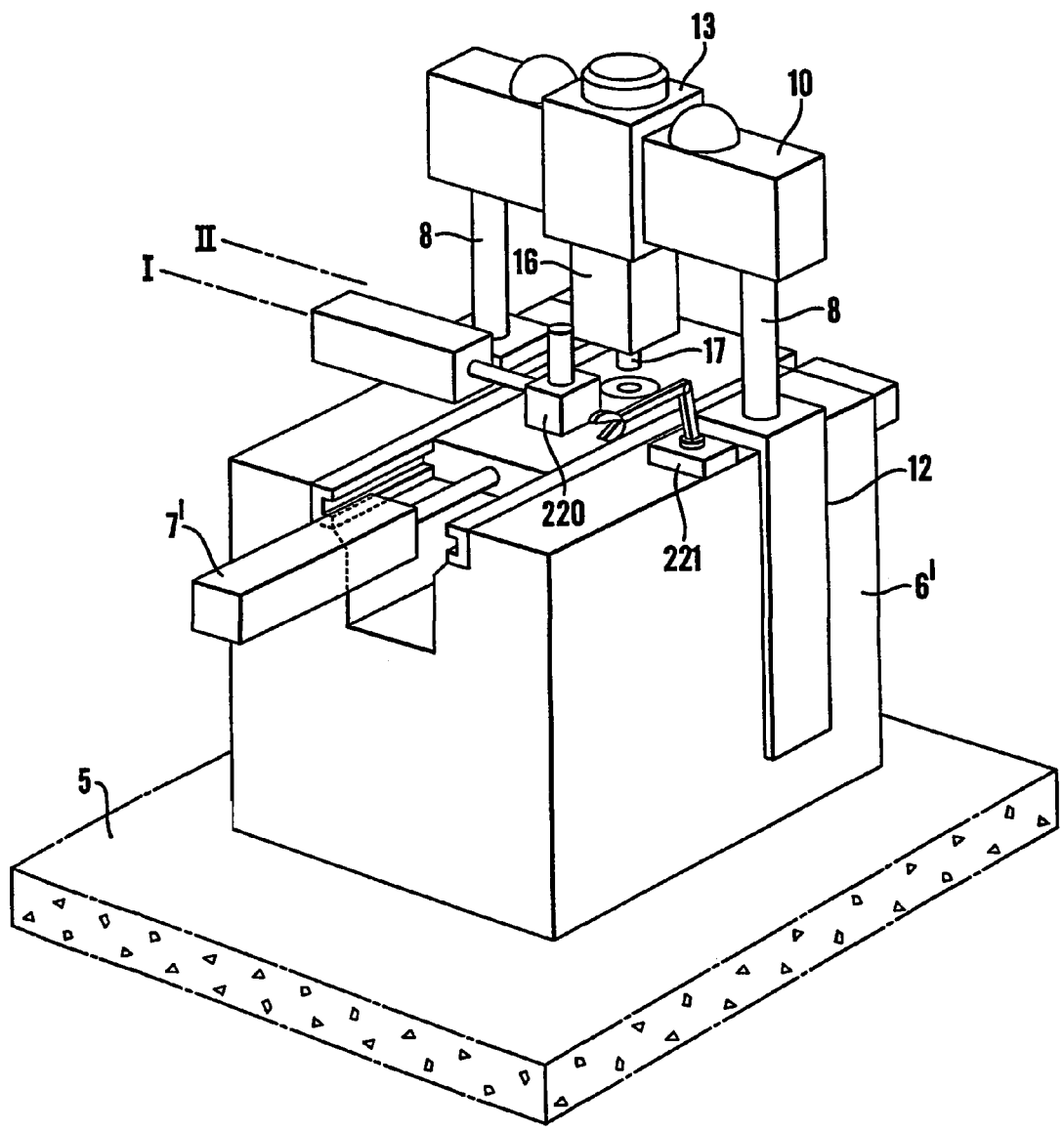

The machine 1', which is shown in FIGS. 12 and 13, is especially suited for manufacturing larger objects, particularly objects with great extension, e.g. plates with varying thickness, but the machine 1' is of course suitable for the manufacturing of smaller articles as well. The embodiment which shall be described concerns manufacturing of objects without through holes, but the machine 1' can be also used for the manufacturing of hollow products according to principles which have been described in the foregoing description of the machine 1, if the machine 1' is provided with suitable tool units and with more function stations.

The main parts of the machine 1' consist of an upper impact unit 2, a lower impact unit 3, a central unit 4' comprising a table which is movable in a horizontal plane, in the following denominated shuttle 30', motion devices in the form of a hydraulic cylinder 7' for the shuttle 30', and a stand 6'.

The stand 6' consists of a robust block on a foundation 5 and contains main channels and distribution channels for a hydraulic fluid to the various hydraulic units in the machine 1' in a manner which can be analogous with the conditions according to the foregoing embodiment.

The upper impact unit 2 is designed in principle in the same way as according to the foregoing embodiment. The various elements of the upper impact unit 2 which are shown in the drawings therefore have been given the same reference numerals as in the embodiment according to FIGS. 1-11. Thus the upper impact unit 2 comprises a yoke 10, which via a pair of piston rods 8 can be raised and lowered by means of a pair of upper, hydraulic lifting cylinders 12, which are safely secured in the stand 6'. The yoke 10 carries an upper, hydraulic impact cylinder 13, which is connected to the yoke and contains an upper ram (not shown), an upper impact body (not shown), which is movable in an upper impact body cylinder 16, and an upper punch 17, which is replaceably connected to the impact body.

In the lower impact unit 3' there is included a movable anvil 200, which is located in a space 201 in the stand 6'. The anvil 200 is mounted in a sliding bearing 202 in the space 201, FIG. 14.

The anvil 200 rests on a number of hydraulic lifting devices 204; either on a single, central, large one, or on a plurality of smaller ones, as according to the example. Each such lifting device 204 consists of a hydraulic cylinder 205, which is secured in the stand 6', a piston unit 206 with a piston 207 in the hydraulic cylinder 205, and a piston rod 208 which in the upper end thereof is provided with a collar 209. The anvil 6' rests on said collared end of the piston unit 206.

In the hydraulic cylinder 205 there are a working chamber 210 and a return chamber 211, which have a very small extension in the vertical direction. Any larger tension is not necessary because the length of the stroke of the piston units 206 need not be great. On top of the anvil 200 there is a hummock 212 which is slightly bevelled on both sides 213 in the direction of the movement of the shuttle 30', FIG. 16.

The shuttle 30' contains and carries, according to the embodiment, only one tool unit 32', which can be designed according to the same principle as the tool units 32 of the foregoing embodiment. Thus it comprises a die 34 in the shuttle 30', a lower punch 27, a lower punch holder 36', and a punch holder guide 37'.

The shuttle 30' can slide in two opposite guide rails 215 in the stand 6' and can be fixed in different function stations by means of conical fixation devices 216, which from opposite directions can be pushed into matching recesses in the longitudinal sides of the shuttle by means of hydraulic cylinders 217, FIG. 12.

According to the embodiment, the machine 1' has only two function stations; a function station I, which is a combined station for filling a mould cavity, ejection and removal of the formed body, and for re-setting the lower punch to a lower, normal position; and a forming station II. In station I there is a filling bucket 220, and an ejector under the shuttle 30' (the ejector, which is not shown, can consist of an ejector rod and a hydraulic cylinder in the same mode as according to the previous embodiment), a picker 221, and a re-setting device 222 (not shown) above the shuttle 30' in function station I.

In the impact cylinder 13 of the upper impact unit 2 there is a working chamber and a return chamber. In a hydraulic circuit between the return chamber of the impact cylinder 13 and the working chamber 210 of the lifting cylinders 20, FIG. 16, there is a hydraulic pressure/flow-converter 240. This has two hydraulic cylinders; a primary cylinder 241 and a secondary cylinder 242. The latter has a much smaller cross-section area than the primary cylinder 241. In the primary cylinder 241 there is a piston 243 with a piston rod, the end portion of which is designed as a plunger 244, which extends down into the secondary cylinder 242. A working chamber on the side which is opposite the piston rod has been designated 246. In the piston 243 there is a connection 252 with a constriction between the working chamber 245 and the return chamber 246.

The working chamber 245 of the converter 240 is connected to the return chamber of the impact cylinder 13 via a hydraulic conduit 269. The return chamber 246 of the converter 240 is connected to a two-way valve 219 via a hydraulic conduit 247. The secondary chamber 242 of the converter 240 is connected to the working chamber 209 of the lifting cylinders 242 via a conduit 248 in which there is a throttle/non-return valve 253. The return chamber 210 of the lifting cylinders operate only as drainage chambers in the said cylinders and are connected to a drainage tank T for hydraulic fluid via conduits 249. A conduit from the valve 219 to the same tank is designated 250. The hydraulic pump P or other pressure source is connected to the two-way valve 219 via a conduit 251.

The described impact machine 1' functions in the following way. The starting position is the position shown in FIG. 12-FIG. 16. The tool unit 32' is in the forming station II, where it has been positioned by the conical fixation devices 216, so that the upper punch 17 has been caused to adopt a position which with great accuracy is coaxial with the tool unit, whereupon the upper punch 17 has been moved down into the die against the working material in the mould cavity in the same way as has been described in connection with the foregoing embodiment. The movable anvil 200 is resting with its hummock 212 against the lower punch holder 36'. The lower punch is in a position which it has been caused to adopt in a foregoing operation in function station I.

By manoeuvring the valve 219, the hydraulic pump P or other pressure source is connected to the working chamber of the impact cylinder 13 via the conduits 251 and 218. The return chamber 246 of the converter 240 at the same time is connected to the drainage tank T via the conduit 247, the valve 219 and the conduit 250. When the working chamber of the impact cylinder 13 is pressurized, the impact piston is moved downwards and is accelerated to achieve a very high velocity. Hydraulic oil in the return chamber of the impact cylinder is pressed via the conduit 260 into the working chamber 245 in the primary cylinder 241 of the converter 240. This develops a pressure in the working chamber 245, which forces the piston 243 and hence the plunger 244 down into the secondary cylinder 242. Due to the fact that the ratio between the cross-section areas of the piston 243 and the plunger 244 is very large, the displacement of the piston 243 during the working stroke of the impact piston will be comparatively small and hence also the movement of the plunger 244 down into the secondary cylinder 242. The amount of hydraulic fluid that is displaced by the plunger 244 is forced through the conduit 248 and is distributed to and is pressed into the working chambers 209 of the lifting cylinders 205. The total cross-section area of the working chambers 209 can for example be equal with the cross-section area of the secondary cylinder 242. This causes the anvil 200 to be lifted by the lifting pistons 206 upwards at the same velocity as the plunger 244 is moved into the secondary chamber 242 in the converter 240. Through a suitable choice of the cross-section areas of the working chamber and the return chamber of the impact cylinder 13, of the working chamber 245 and the secondary cylinder 242 of the converter 240, and of the working chambers 209 of the lifting cylinders, and under consideration of the counter pressures in the return chamber of the impact cylinder 13 and in the return chamber 246 of the converter 240, the entire anvil assembly, which includes the anvil 200 and the tool unit 32', can be moved upwards and accelerated such that the impact piston of the upper impact unit 2 will strike the impact body in said unit with a velocity of the impact piston and of the anvil assembly staying the formula $$m_1 \times v_1 \approx m_2 \times v_2, \text{ where}$$

$m_1$ is the total mass of the ram unit (the ram and the impact body) of the upper impact unit, $v_1$ is the velocity of the ram unit, when the ram unit strikes against the working material in the mould cavity, $m_2$ is the mass of the anvil assembly, and $v_2$ is the velocity of the anvil assembly, when it strikes from below against the lower punch holder 36'.

EXAMPLE

In a conceived case, the masses, the cross-section areas, and the stroke lengths were the following:

The pressure in the working chamber of the impact cylinder=300 bar.

The total mass $m_1$ of the impact piston and the impact body (in the upper impact unit 2)=350 kg.

The stroke length $s_I$ of the impact piston=100 mm.

The displaced volume in the return chamber of the impact cylinder=500 cm³.

The cross-section area $A_1$ of the working chamber 245 of the converter 240=200 cm².

The cross-section area $A_2$ of the secondary chamber 242 of the converter 242=10 cm².

The cross-section area $A_B$ of the four working chambers 209 of the lifting cylinders 205=50 cm².

The pressure in the working chamber 245 of the converter 240=about 19 bar.

The total mass of the anvil assembly≅7000 kg.

When the above conditions apply, the anvil assembly, i.e. the anvil 200 with the tool unit 32', will move upwards about 5 mm and achieve a velocity of 0.4 m/s, when the ram unit of the upper impact unit hits the working material in the mould cavity at a velocity of 8 m/s. Thus the following applies for the formula $m_1 \times v_1 \cong m_2 \times v_2$ $$350 \times 8 \cong 7000 \times 0,4$$

At the performance of the towards one another directed movements of the ram unit and of the anvil, the ram unit and the anvil assembly thus will have the same momentum (quantity of motion) which implies that any essential shock waves do not arise, and the shuttle 30' will not be subjected to any essential influence by the stroke.

Figure 14:
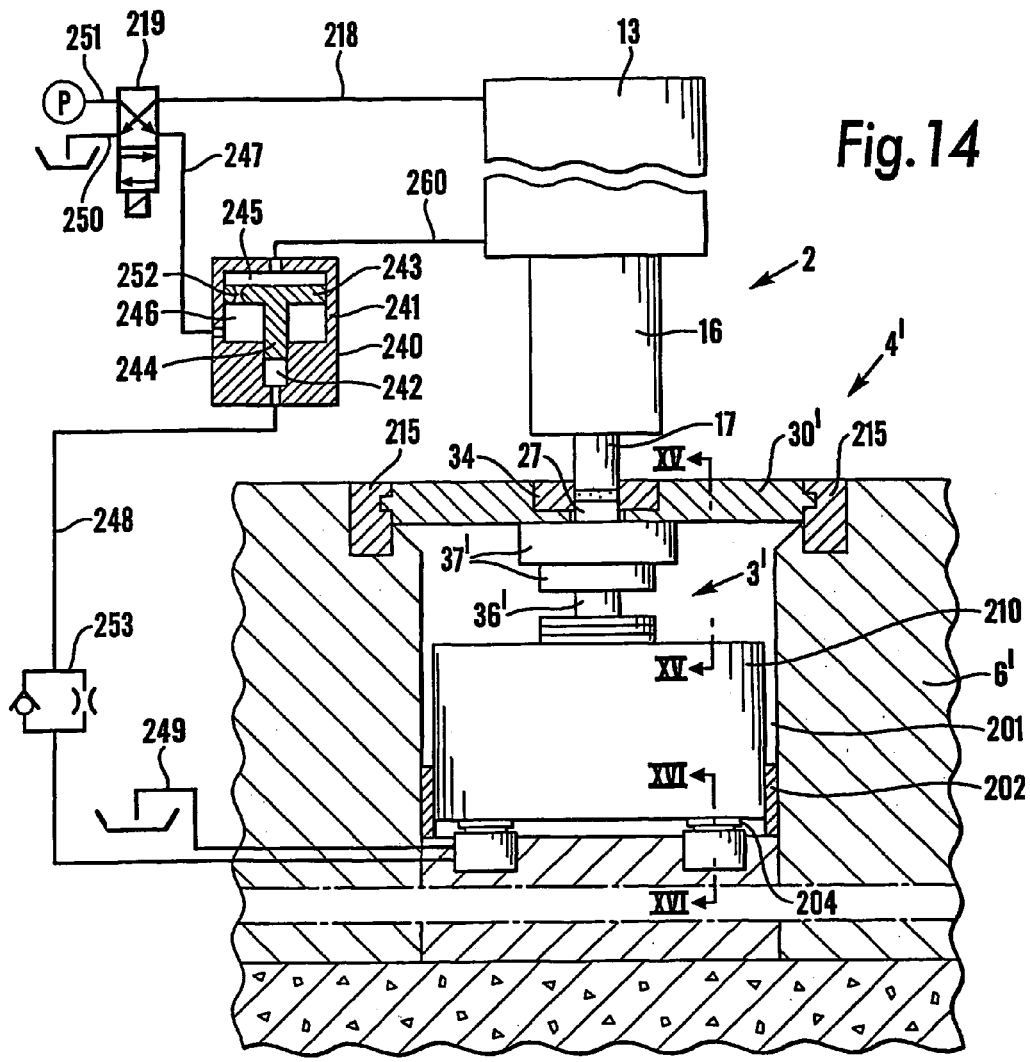
FIG. 14 shows the machine according to FIG. 12 and FIG. 13 in cross-section and a hydraulic circuit for lifting the anvil.
Figure 15:
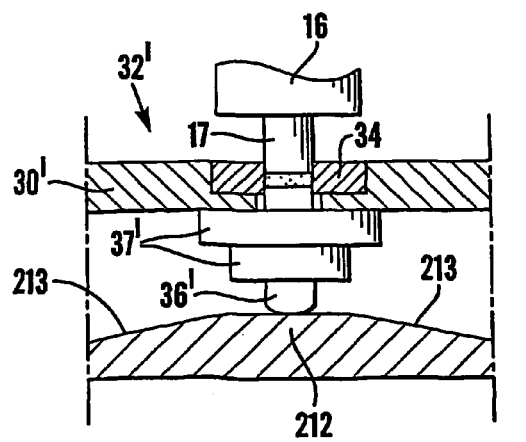
FIG. 15 is a view along the line XV-XV in FIG. 14.
Figure 16:
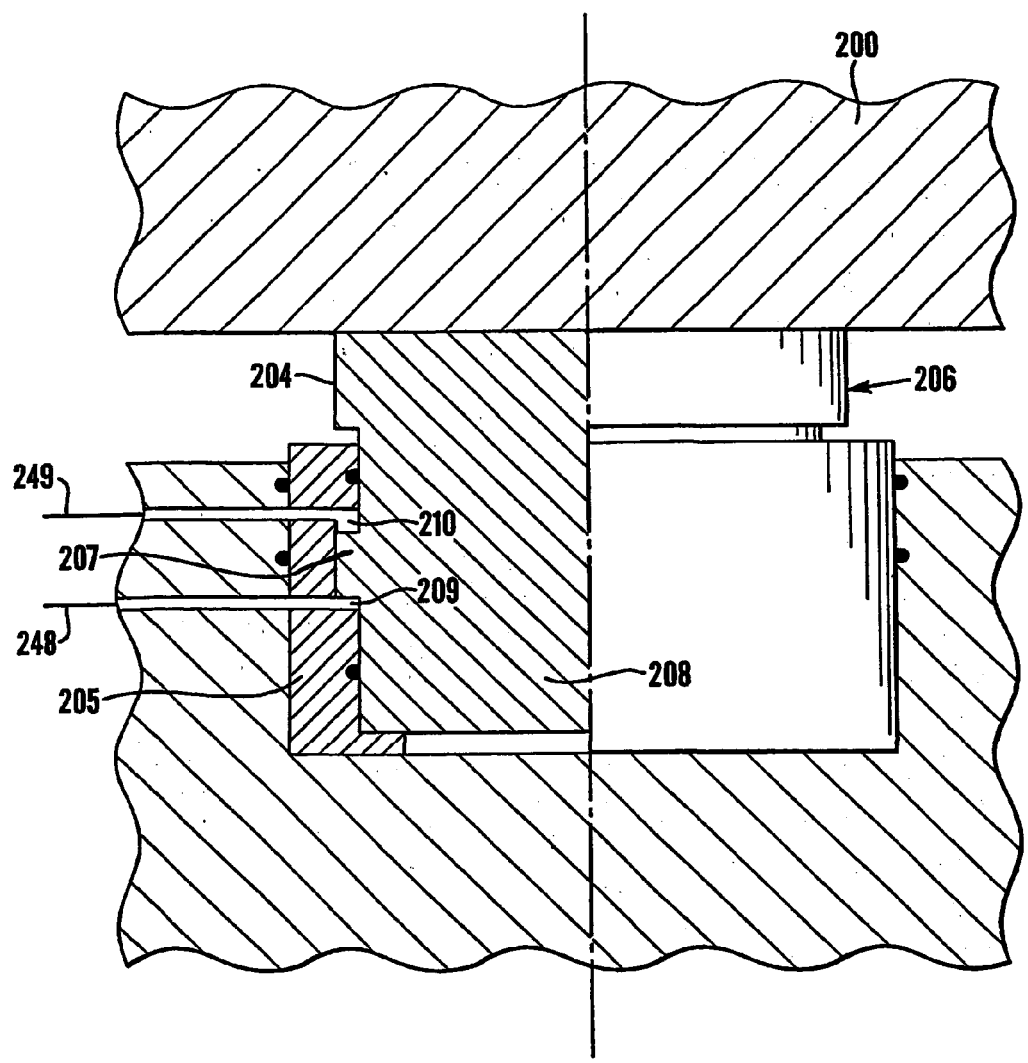
FIG. 16 is a view along the line XVI-XVI in FIG. 15 at a larger scale.

When the stroke has been performed, the valve 219 is immediately switched back to the starting position shown in FIG. 14. Herein the return chamber 246 of the converter 240 is connected to the hydraulic pump P via the conduit 247, the valve 219 and the conduit 251, and the working chamber of the impact cylinder 13 is connected to the drainage tank T via the conduit 218, the valve 219 and the conduit 250. The return or drainage chamber 210 of the lifting cylinders 205 is continuously connected to the drainage tank T via the conduit 249. The anvil 200 drops down under the influence of its large mass and forces the hydraulic fluid from the working chambers 209 in the lifting cylinders back to the secondary chamber 242 of the converter 240 via the conduit 248. This causes the piston 243 to be lifted by the plunger 244, which drives the hydraulic fluid from the working chamber 245 via the conduit 260 to the return chamber of the impact cylinder, returning the impact piston to its starting position. Also the pressure in the return chamber 246 of the converter, which chamber during this phase is connected to the hydraulic pump P, contributes in this return movement. In case of possible functional disorders, it is secured that the impact piston is returned to its starting position because of the fact that the return chamber 245 of the converter 240 is slowly pressurised by the hydraulic pump P via the constricted connection 252 in the piston 243 in the converter. The filling of the secondary chamber 242 is suitably secured through an adapted leakage in concerned gaps.

The working material in the mould cavity has now been consolidated to a jointed body having desired shape. During the stroke, the shuttle has been released from the fixation devices 216 and is returned, such that the tool unit 32' will adopt function station I. In this station, the formed body is ejected and is removed by the picker 221. The lower punch 27 is pushed down to its intended lower position by the re-setter 22, whereupon the mould cavity in the die 34 is filled with new working material by means of the filling bucket 220. Alternatively a solid blank is placed in the mould cavity. Then the shuttle is returned, so that the tool unit 32' will adopt its position in forming station II, where the shuttle is fixed by means of the conical fixation devices 216, wherein the machine is ready for a new forming operation.

According to the embodiment, the shuttle 30' carries only one tool unit 32'. Through the provision of two identically equal tool units 32' and two identically equal function stations I, one on each side of the forming station II, the production capacity of the machine 1' can be increased. In that case, the formed body can be removed, the mould cavity can be re-set and be filled with new working material in one of the function stations I, while the impact units 2 and 3' are being prepared for a new forming operation in the forming station II by alternatively employing one or the other of the function stations I during said preparatory measures in forming station II. The completion of the impact machine 1', however, has not been shown in the drawings, but it should be understood that said complementary additions can be carried out win the scope of the fundamental mode of operation of the described working machine 1'. It is also possible to part the shuttle 30' into two shuttles, which may slide in the same guides 215, wherein each shuttle contains a tool unit 32' and is provided with a separate motion device, e.g. a hydraulic cylinder 7'. Each such parted shuttle is provided with devices in order to be fixed in exact position for the tool unit 32' in the forming station II. As fir as the embodiment of that kind is concerned, more function stations can also be provided for the carrying out of the various tasks, which are carried out in function station I of the shown machine 1', e.g. one station for ejection the formed product, another station for re-setting the lower punch to desired position in the die, and a third station for filling the mould cavity, which makes it possible to carry out said measures in the thus separated function stations, while one of the shuttles is in any of the other function stations.

The invention claimed is:

1. A method of forming a body with desired shape of a formable working material through impact action in a forming operation, the method comprising the steps of:
    a) providing an impact machine, the impact machine comprising a machine stand and at least one movable carrier which contains and carries a plurality of tool units, each one of which comprises a die having a mould cavity for the working material that shall be formed,
    b) placing a working material in a die when the carrier is in a position where the die is located at a filing station,
    c) moving the at least one carrier in a horizontal plane such that the die in which the working material has been placed is moved from the filling station to a forming station in which the working material is to be formed, and
    d) at the forming station, forming the working material to a body of desired shape by striking the working material in the die from opposite directions with movable masses that strike the working material simultaneously such that the kinetic energies of the movable masses during the forming operation are essentially transferred to the working material in the mould cavity and are so great that the working material is plasticised and flows out to fill all parts of the mould cavity, to form said body with desired shape, the movable masses that strike the working material from opposite directions having such masses and such velocities that the momentum of the movable mass striking the working material from one direction is essentially equally large as the momentum of the movable mass striking the working material from the opposite direction.

2. A method according to claim 1, wherein movable masses generate a pressure pulse having a magnitude in the range of 1-10 GPa.

3. A method according to claim 1, wherein, after the forming step, the carrier is moved to an ejecting station where the formed body is ejected from the die.

4. A method according to claim 1, wherein the carrier comprises a horizontal turntable and moves by turning stepwise about a horizontal axis of rotation for positioning the tool units in the various function stations.

5. A method according to claim 1, wherein the carrier moves along a linear movement path.

6. A method according to claim 1, wherein the carrier or carriers is locked in its position when it has been moved to a new position.

7. A method according to claim 1, wherein the working material is a powder material.

8. A method according to claim 7, wherein a lid is placed over the powder material after the powder material has been placed in the die.

9. A method of forming a body with desired shape of a formable working material through impact action in a forming operation, the method comprising the steps of:
   a) providing an impact machine, the impact machine comprising a machine stand, an upper unit which comprises an impact unit with an upper ram and an upper punch, a lower unit which comprises a lower impact unit, which comprises a counter-impact device, and a central unit between the upper and the lower units, the central unit comprises one or more movable carriers which contain and carry one or a plurality of tool units, each one of which comprises a die having a mould cavity for the working material that shall be formed, said carriers including at least one carrier which is stationary during the forming operation and which contains at least one such tool unit;
   b) placing a working material in a die of a carrier when the carrier is in a position where the die is located at a filing station,
   c) moving the carrier in a horizontal plane to move the die from the filing station to a forming station in which the die is coaxial with the upper punch, and
   d) forming the working material to a body of desired shape by striking the working material in the die with movable masses in a downwardly directed strike and a simultaneous upwardly directed strike such that the kinetic energies of the movable masses during the forming operation, which comprise a single stroke of the upper ram are essentially transferred to the working material in the mould cavity and are so great that the working material is plasticised and flows out to fill all parts of the mould cavity, to form said body with desired shape, the movable mass that strikes the working material in the downwardly directed strike including the mass of the upper ram and the upper punch and the movable masses that strike the working material from opposite directions having such masses and such velocities that the momentum of the movable mass striking the working material from one direction is essentially equally large as the momentum of the movable mass striking the working material from the opposite direction.

* * * * *